US008706652B2

(12) United States Patent
Yang et al.

(10) Patent No.: US 8,706,652 B2
(45) Date of Patent: Apr. 22, 2014

(54) SYSTEM AND METHOD FOR CONTROLLING POWER CONSUMPTION IN A COMPUTER SYSTEM BASED ON USER SATISFACTION

(75) Inventors: Lei Yang, Sunnydale, CA (US); Robert P. Dick, Chelsea, MI (US); Xi Chen, San Jose, CA (US); Gokhan Memik, Evanston, IL (US); Peter A. Dinda, Evanston, IL (US); Alex Shye, Evanston, IL (US); Berkin Ozisikyilmaz, Chicago, IL (US); Arindam Mallik, Leuven (BE); Alok Choudhary, Chicago, IL (US)

(73) Assignee: Northwestern University, Evanston, IL (US)

(*) Notice: Subject to any disclaimer, the term of this patent is extended or adjusted under 35 U.S.C. 154(b) by 340 days.

(21) Appl. No.: 12/796,934

(22) Filed: Jun. 9, 2010

(65) Prior Publication Data

US 2011/0004575 A1    Jan. 6, 2011

Related U.S. Application Data

(60) Provisional application No. 61/185,365, filed on Jun. 9, 2009, provisional application No. 61/185,381, filed on Jun. 9, 2009.

(51) Int. Cl.
   *G06F 15/18*    (2006.01)

(52) U.S. Cl.
   USPC ............ 706/12; 713/323; 713/300; 706/16; 709/224; 345/211

(58) Field of Classification Search
   None
   See application file for complete search history.

(56) References Cited

U.S. PATENT DOCUMENTS

| 5,987,614 | A  | * | 11/1999 | Mitchell et al. ............... 713/300 |
| 6,148,408 | A  |   | 11/2000 | Shimoda |
| 2003/0033483 | A1 | * | 2/2003 | O'Connor ..................... 711/122 |
| 2003/0074440 | A1 | * | 4/2003 | Grabarnik et al. ............ 709/224 |
| 2006/0192775 | A1 |   | 8/2006 | Nicholson et al. |
| 2007/0094172 | A1 | * | 4/2007 | Thaler ............................ 706/16 |
| 2007/0288782 | A1 | * | 12/2007 | Chang et al. .................. 713/323 |
| 2008/0301474 | A1 | * | 12/2008 | Bussa et al. .................... 713/300 |

OTHER PUBLICATIONS

"Low-power Design Methodology and Applications utilizing Dual Supply Voltages", Kimiyoshi Usami, Design Methodology Department System LSI Design Division, Toshiba Corporation, Semiconductor Company, 2000.*
IS3313 Systems Software Lecture 1, Dr. Tom Butler, afis.ucc.ie/tbutler/Energy%20and%20IT.doc.*
Wikipedia definition of Frequency scaling, http://en.wikipedia.org/wiki/Frequency_scaling.*

* cited by examiner

*Primary Examiner* — Kakali Chaki
*Assistant Examiner* — Luis Sitiriche
(74) *Attorney, Agent, or Firm* — Klintworth & Rozenblat IP LLC

(57) ABSTRACT

Systems and methods for controlling power consumption in a computer system. For each of a plurality of interactive applications, the method changes a frequency at which a processor of the computer system runs, receives an indication of user satisfaction, determines a relationship between the changed frequency and the user satisfaction of the interactive application, and stores the determined relationship information. The determined relationship can distinguish between different users and different interactive applications. A frequency may be selected from the discrete frequencies at which the processor of the computer system runs based on the determined relationship information for a particular user and a particular interactive application running on the processor of the computer system. The processor may be adapted to run at the selected frequency.

20 Claims, 15 Drawing Sheets

IF 150 ms have passed since the last frequency state adjustment
AND Performance has increased by 20% since the last evaluation
Increase $f$ by one level within the next 10 ms

IF 500 ms have passed since the last frequency state adjustment
AND Performance has decreased by 30% since the last evaluation
AND A decrease of frequency state by one operating point will remain above 50% of the maximum frequency state
Decrease $f$ by one level within the next 10 ms

Fig. 3

SYSTEM AND METHOD FOR CONTROLLING POWER CONSUMPTION IN A COMPUTER SYSTEM BASED ON USER SATISFACTION

CROSS-REFERENCE TO RELATED APPLICATIONS/INCORPORATION BY REFERENCE

This patent application makes reference to, claims priority to and claims benefit from U.S. Provisional Application Ser. No. 61/185,381 which was filed on Jun. 9, 2009; and U.S. Provisional Application Ser. No. 61/185,365 which was filed on Jun. 9, 2009.

This patent application is related to U.S. Provisional Application Ser. No. 61/185,372 which was filed on Jun. 9, 2009.

The above-referenced applications are hereby incorporated herein by reference in their entirety.

FEDERALLY SPONSORED RESEARCH OR DEVELOPMENT

This invention was made with government support under grant nos. CNS-0720691; CNS-0721978; CNS-0715612; CNS-0551639; CNS-0347941; CCF-0541337; CCF-0444405; CCF-0747201; IIS-0536994; IIS-0613568; ANI-0093221; ANI-0301108; and EIA-0224449 awarded by the National Science Foundation. The government has certain rights in the invention.

This invention was made with government support under grant nos. DE-FG02-05ER25691 and DE-AC05-00OR22725 awarded by the Department of Energy. The government has certain rights in the invention.

MICROFICHE/COPYRIGHT REFERENCE

[Not Applicable].

FIELD OF THE INVENTION

The present invention relates to architectural optimization and, in particular, architectural optimization aimed at user satisfaction.

BACKGROUND OF THE INVENTION

Modern architectures execute with no knowledge about the individual user.

Accordingly, there is a need for architectures that are user-aware and that determine whether their users are satisfied. There is also a need for architectural optimization that aims at user satisfaction.

BRIEF SUMMARY OF THE INVENTION

Some embodiments according to the present invention may provide, for example, systems and methods for controlling power consumption in a computer system are disclosed. The computer system may be trained, for example, to determine relationship information between user satisfaction and discrete frequencies at which a processor of the computer system runs. The determined relationship can distinguish between different users and different interactive applications. A frequency may be selected from the discrete frequencies at which the processor of the computer system runs based on the determined relationship information for a particular user and a particular interactive application running on the processor of the computer system. The processor may be adapted to run at the selected frequency.

Some embodiments according to the present invention provide for determining a relationship between hardware performance counter (HPC) readings and individual satisfaction levels reported by users for representative applications. The relationship may be, for example, an artificial neural network that models functions from HPCs to user satisfaction for individual users. The artificial neural network can be used online, for example, to predict user satisfaction and to set the frequency level accordingly.

Some embodiments according to the present invention provide for a human and application driven frequency scaling for processor power efficiency (HAPPE) that can, for example, adapt voltage and frequency to the performance requirement of the current user and current application.

Some embodiments according to the present invention minimize power consumption without degrading user-perceived performance.

Some embodiments according to the present invention provide for the consideration of user satisfaction to control a power state.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3 shows a Windows XP DVFS algorithm according to some embodiments of the present invention.

DETAILED DESCRIPTION OF THE INVENTION

Figure 1:
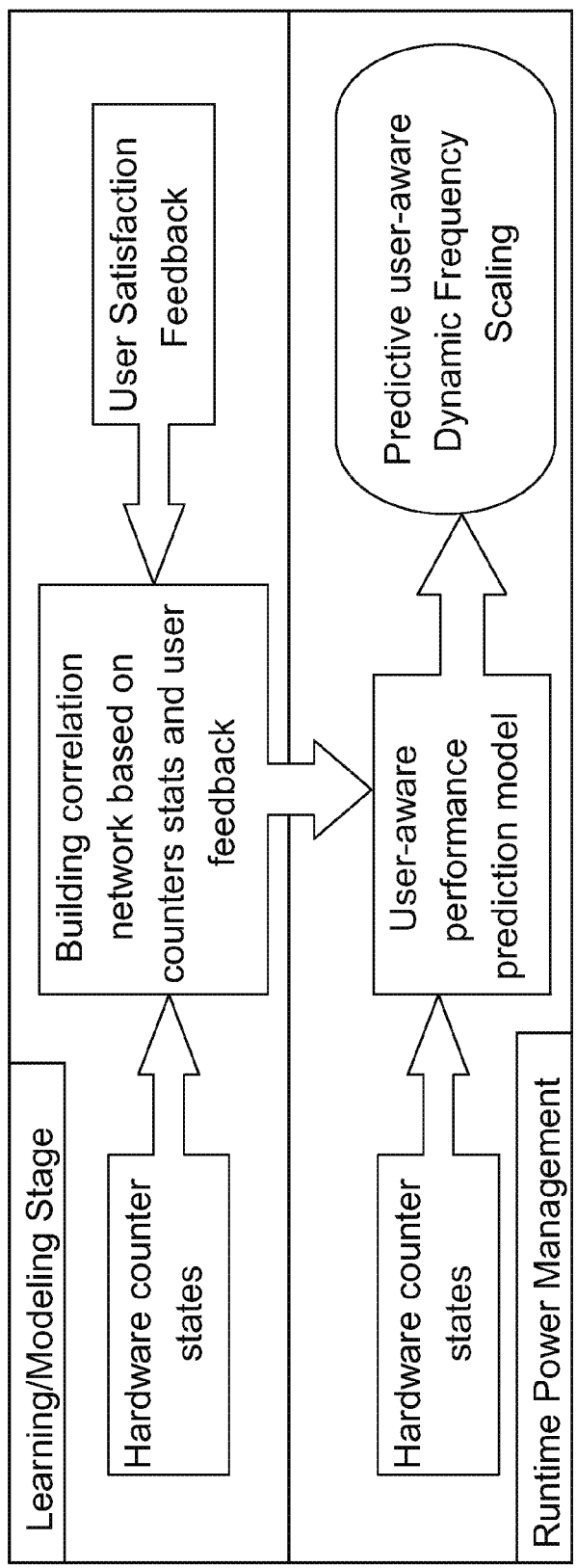
FIG. 1 shows a framework of a predictive user-aware power management according to some embodiments of the present invention.

One of the goals of computer design is to satisfy the end user. In particular computing domains such as interactive applications, for example, there exists a variation in user expectations and user satisfaction relative to the performance of existing computer systems.

Some embodiments according to the present invention contemplate leveraging this variation to develop more efficient architectures that are customized to end users. We first investigate the relationship between microarchitectural parameters and user satisfaction. Specifically, we analyze the relationship between hardware performance counter (HPC) readings and individual satisfaction levels reported by users for representative applications. Our results show that the satisfaction of the user is strongly correlated to the performance of the underlying hardware. Furthermore, the results show that user satisfaction is highly user-dependent. To take advantage of these observations, some embodiments according to the present invention provide a framework called Individualized Dynamic Voltage and Frequency Scaling (iDVFS). We study a group of users to characterize the relationship between the HPCs and individual user satisfaction levels. Based on this analysis, some embodiments according to the present invention use artificial neural networks to model the function from HPCs to user satisfaction for individual users. The model is then used online to predict user satisfaction and set a frequency level accordingly. A second set of user studies demonstrates that iDVFS reduces the CPU power consumption by over 25%, for example, in representative applications as compared to the Windows XP DVFS algorithm.

Architectural optimization in, for example, performance, power, reliability, security, etc. aims at satisfying the end user in some embodiments according to the present invention. However, understanding the happiness of the user during the run of an application can be complicated. Although it may be possible to query the user frequently, such explicit interaction may annoy most users. Therefore, it would be beneficial to estimate user satisfaction using implicit metrics in accordance with some embodiments of the present invention. Traditionally, computer architects have used implicit metrics such as instructions retired per second (IPS), processor frequency, or the instructions per cycle (IPC) as optimization objectives. The assumption behind these metrics is that they relate in a simple way to the satisfaction of the user. When two systems are compared, it is assumed, for example, that the system providing a higher IPS will result in higher user satisfaction. For some application domains, this assumption is possibly correct. For example, the execution time of a long running batch application is largely determined by the IPS of the processor. Hence, increasing IPS will result in an increase in user satisfaction. However, some embodiments according to the present invention contemplate that the relationship between hardware performance and user satisfaction is complex for interactive applications and an increase in a metric like IPS, for example, does not necessarily result in an increase in user satisfaction. Furthermore, some embodiments according to the present invention contemplate that the relationship between hardware performance and user satisfaction is highly user-dependent. Hence, some embodiments according to the present invention contemplate the feasibility of estimating individual user satisfaction from hardware metrics, develop accurate non-linear models to do so, and use these models for run-time power management.

Driving architectural decisions from estimates of user satisfaction has several advantages in accordance with some embodiment of the present invention. First, user satisfaction is highly user-dependent. For example, an expert gamer will likely demand considerably more computational power than a novice user. In addition, each user has a particular "taste" such as, for example, a preference for prolonging battery life, or a preference for higher performance. If we know the individual user's satisfaction with minimal perturbation of program execution, we will be able to provide a better experience for the user in accordance with some embodiments of the present invention. Second, when a system optimizes for user satisfaction, the system automatically customizes for each application. Specifically, a system that knows the user's satisfaction for a particular application will provide the necessary performance to the user. For interactive applications, this may result in significant advantages such as power savings and/or increased lifetime reliability. For example, one of our target applications exhibits no observable change in performance when the frequency of the processor is set to its lowest level. In this case, our system drastically reduces the power consumption compared to traditional approaches without sacrificing user satisfaction in accordance with some embodiments of the present invention.

Some embodiments according to the present invention contemplate mapping microarchitectural information to user satisfaction. Such a map can then be used to understand how changes in microarchitectural metrics affect user satisfaction. Modern microprocessors include integrated hardware performance counters (HPCs) that count architectural events (e.g., cache misses) as well as a variety of events related to memory and operating system behavior. Some embodiments according to the present invention provide a mapping from the HPC readings to user satisfaction. We first show that there is a strong correlation between the HPCs and user satisfaction in accordance with some embodiments of the present invention. However, some embodiments according to the present invention contemplate that the relationship between the two is often non-linear and user-dependent.

A good estimate of user satisfaction derived from microarchitectural metrics can be used to minimize power consumption while keeping users satisfied in accordance with some embodiments of the present invention. Although utilizing user satisfaction in making architectural decisions can be employed in many scenarios, some embodiments according to the present invention employ dynamic voltage and frequency scaling (DVFS), which is a power reduction techniques used in modern processors. DVFS make decisions online to change microprocessor frequency and voltage according to processing needs. Existing DVFS techniques in high-performance processors select an operating point (e.g., CPU frequency and voltage) based on the utilization of the processor. Like many other architectural optimizations, DVFS is pessimistic about user satisfaction and assumes that the maximum processor frequency is necessary for every process that has a high CPU utilization. We show that incorporating user satisfaction into the decision making process can improve the power reduction yielded by DVFS in accordance with some embodiments of the present invention.

Some embodiments according to the present invention use the strong relationship between HPCs and user satisfaction for interactive applications. This relationship is often nonlinear, complex, and highly user-dependent.

Some embodiments according to the present invention accurately predict individual user satisfaction using neural network models.

Some embodiments according to the present invention use Individualized Dynamic Voltage and Frequency Scaling (iDVFS), which may employ user satisfaction predictions in making decisions about the frequency of the processor. In some embodiments according to the present invention, iDVFS is implemented and evaluated on Windows with user studies that show it reduces power consumption compared to Window DVFS, for example.

Some embodiments according to the present invention provide for microprocessors that include integrated hardware performance counters (HPC) for non-intrusive monitoring of a variety of processor and memory system events. HPCs provide low-overhead access to a wealth of detailed performance information related to CPU's functional units, caches, main memory, etc. Even though this information is generally statistical in nature, it does provide a window into certain behaviors that are otherwise impractical to observe. For example, these events include various counts of instructions, cache activity, branch mispredictions, memory coherence operations, and functional unit usage. Several tools and microprocessors have extended this functionality beyond simple event counting. For example, Intel's Itanium processors have features that allow monitoring specific events based on an instruction or data address range, a specific instruction opcode, or execution at specific privilege levels.

Some embodiments according to the present invention provide for microprocessors that support a limited number of HPCs. For example, the IA-64 architectures only support counting four events at a time. In our experiments, we use the Pentium M processor which only supports two counters at a time. As a result, it is not possible to collect all hardware information simultaneously, although the present invention is not so limited. Some embodiments according to the present invention using a workaround in which sets of counters are time multiplexed and then the values scaled appropriately. It has been shown that time multiplexing up to 10 sets of counters provides statistically significant counter values. Despite this limitation, the low-overhead access to low-level architectural information provided by HPCs is very useful and may be leveraged in run-time profiling and optimization systems.

Some embodiments according to the present invention use WinPAPI, the Windows variant of PAPI, to access the HPCs present in the processor. Some embodiments according to the present invention use at least the nine specific performance metrics listed in Table 1. These counters may be manually selected as a representative set of the HPCs available on the Pentium M. The choice of using only nine counters is due to a WinPAPI limitation, but the present invention need not be so limited. We collect counter values every 100 ms. WinPAPI automatically time multiplexes and scales the nine event counters.

TABLE 1

HPCs used in experiments.

| PAN counter | Description |
| --- | --- |
| PAPI_TOT_INS | Instructions issued |
| PAPI_RES_STL | Cycles stalled on any resource |
| PAPI_TOT_CYC | Total cycles |
| PAPI_L2_TCM | Level 2 cache misses |
| PAPI_BTAC_M | Branch target address cache misses |
| PAPI_BR_MSP | Conditional branches mispredicted |
| PAPI_HW_INT | Hardware interrupts |
| PAPI_L1_DCA | Level 1 data cache accesses |
| PAPI_L1_ICA | Level 1 instruction cache accesses |

Some embodiments according to the present invention contemplate the relationships between different microarchitectural parameters and user satisfaction. In one or more of the embodiments according to the present invention, we conduct two sets of studies with 20 users, for example. Our experiments are done using, for example, an IBM Thinkpad T43p with a 2.13 GHz Pentium M-770 CPU and 1 GB memory running Microsoft Windows XP Professional SP2. The laptop is tethered to the power outlet during all experiments. Although eight different frequency levels can be set on the Pentium M-770 processor, only six can be used due to limitations in the SpeedStep technology. For both user studies, we experiment with three types of applications: a 3D Shockwave animation, a Java game, and high-quality video playback. The details of these applications follow:

Shockwave: Watching a 3D Shockwave animation using the Microsoft Internet Explorer web browser. The user watches the animation and is encouraged to press the number keys to change the camera's viewpoint. The animation is stored locally. Shockwave options are configured so that rendering is done entirely in software on the CPU.

Java Game: Playing a Java based First Person Shooter (FPS). The users have to move a tank and destroy different targets to complete a mission. The game is CPU-intensive Video: Watching a DVD quality video using Windows Media Player. The video uses high bandwidth MPEG-4 encoding.

Since some embodiments according to the present invention focus on the CPU, we picked three applications with varying CPU requirements: the Shockwave animation is very CPU-intensive, the Video places a relatively low load on the CPU, and the Java game falls between these extremes.

Our user studies are double-blind, randomized, and intervention-based. We developed a user pool by advertising our studies within Northwestern University. While many of the participants were CS, CE, or EE graduate students, our users included inexperienced computer users as well.

An objective of our first user study is to explore the correlation between HPCs and user satisfaction in accordance with some embodiments of the present invention. The monitored hardware counters are listed in Table 1. In this first set of experiments, the users are asked to carry out the three application tasks as described above. During execution, we randomly change the frequency and ask the users to verbally rank their experience on a scale of 1 (e.g., discomfort) to 10 (e.g., very comfortable). Users typically provided a satisfaction rating within 5-10 seconds. These satisfaction levels are then recorded along with the HPC readings and analyzed as described below in accordance with some embodiments of the present invention. Then we compute the maximum, minimum, average, range, and the standard deviation of the counter values for up to 5 seconds within the given interval. The end result is a vector of 45 metrics for each satisfaction level reported by the user. Note that since we have performed the user studies with 20 users and three applications, we collected 360 user satisfaction levels.

We then find the correlation of the 45 metrics to the user satisfaction rating by using the formula:

$$r_{x,y} = \frac{N\sum xy - (\sum x)(\sum y)}{\sqrt{[N\sum x^2 - (\sum x)^2][N\sum y^2 - (\sum y)^2]}}$$

Pearson's Product Moment Correlation Coefficient (r) determines a correlation among two data series (e.g., x and y) and results in a value between −1 and 1. If the correlation is negative, the series have a negative relationship; if the correlation is positive, the series have a positive relationship. The closer the coefficient is to either −1 or 1, the stronger the correlation between the variables. Thus, the magnitude of these correlations allows us to compare the relative value of each independent variable in predicting the dependent variable in accordance with some embodiments of the present invention.

The correlation factors for each of the 45 parameters and the user rating are presented in Table 2 in accordance with some embodiments of the present invention.

TABLE 2

Correlation between the hardware performance counters and user satisfaction

| Performance Metrics | Correlation |
|---|---|
| PAPI_BTAC_M-avg | 0.771 |
| PAPI_L1_ICA-avg | 0.770 |
| PAPI_L1_ICA-stdev | 0.770 |
| PAPI_BTAC_M-stdev | 0.770 |
| PAPI_L1_DCA-stdev | 0.768 |
| PAPI_TOT_INS-avg | 0.768 |
| PAPI_TOT_CYC-avg | 0.767 |
| PAPI_L1_DCA-max | 0.767 |
| PAPI_TOT_CYC-stdev | 0.767 |
| PAPI_TOT_INS-stdev | 0.766 |
| PAPI_L1_DCA-avg | 0.766 |
| PAPI_RES_STL-avg | 0.761 |
| PAPI_RES_STL-stdev | 0.761 |
| PAPI_TOT_CYC-max | 0.756 |
| PAPI_L1_ICA-max | 0.749 |
| PAPI_RES_STL-max | 0.738 |
| PAPI_BTAC_M-max | 0.733 |
| PAPI_TOT_INS-max | 0.729 |
| PAPI_L2_TCM-avg | 0.722 |
| PAPI_L1_DCA-range | 0.721 |
| PAPI_L2_TCM-stdev | 0.709 |
| PAPI_RES_STL-min | 0.694 |
| PAPI_TOT_CYC-min | 0.689 |
| PAPI_RES_STL-range | 0.684 |
| PAPI_L1_ICA-min | 0.682 |
| PAPI_L1_ICA-range | 0.675 |
| PAPI_BR_MSP-avg | 0.662 |
| PAPI_BTAC_M-range | 0.653 |
| PAPI_TOT_CYC-range | 0.644 |
| PAPI_BR_MSP-stdev | 0.638 |
| PAPI_TOT_INS-range | 0.625 |
| PAPI_TOT_INS-min | 0.603 |
| PAPI_L1_DCA-min | 0.528 |
| PAPI_L2_TCM-max | 0.525 |
| PAPI_BR_MSP-min | 0.503 |
| PAPI_L2_TCM-range | 0.497 |
| PAPI_L2_TCM-min | 0.495 |
| PAPI_BR_MSP-max | 0.379 |
| PAPI_BR_MSP-range | 0.360 |
| PAPI_BTAC_M-min | 0.289 |
| PAPI_HW_INT-max | 0.131 |
| PAPI_HW_INT-range | 0.119 |
| PAPI_HW_INT-min | 0.112 |
| PAPI_HW_INT-stdev | 0.094 |
| PAPI_HW_INT-avg | 0.048 |

In summary, we observe a strong correlation between the hardware metrics and user satisfaction rating: there are 21 parameters that correlate with the user satisfaction rating by a factor above 0.7 (e.g., these 21 parameters have a factor ranging between 0.7 and 0.8) and there are 35 parameters with factors exceeding 0.5. On one hand, some of the results appear to be intuitive; it is believable that, for example, metrics representing processor performance relate to user satisfaction. On the other hand, observing the link between such a high-level quantity as measured user satisfaction and such low-level metrics as level 2 cache misses is intriguing.

Some embodiments according to the present invention classify the metrics (and their correlations with user satisfaction) based on their statistical nature (e.g., mean, maximum, minimum, standard deviation, and range). The mean and standard deviation of the hardware counter values, for example, have the highest correlation with user satisfaction rating. A t-test analysis shows with over 85% confidence that mean and standard deviation both have higher r values when compared to the minimum, maximum, and range of the HPC values.

Some embodiments according to the present invention analyze the correlations between the satisfaction results and user. Note that the r value might not be used for this purpose, as the user numbers are not independent. Instead, some embodiments according to the present invention repeatedly fit neural networks to the data collected for each application, attempting to learn the overall mapping from HPCs to user satisfaction. As the inputs to the neural network, some embodiments according to the present invention use the HPC statistics along with a user identification for each set of statistics. The output is the self-reported user satisfaction rating. In each fitting, some embodiments according to the present invention begin with a three-layer neural network model using 50 neurons in the hidden layer (neural networks are further described below). After each model is trained in accordance with some embodiments of the present invention, a sensitivity analysis is performed to find the effect of each input on the output. Sensitivity analysis consists of making changes at each of the inputs of the neural network and observing the corresponding effect on the output. The sensitivity to an input parameter is measured on a 0 to 1 scale, called the relative importance factor, with higher values indicating higher sensitivity. By performing sensitivity analysis in accordance with some embodiments of the present invention, the input parameters that are most relevant in determining an output parameter, e.g., user satisfaction, can be determined. During this process in accordance with some embodiments of the present invention, we consistently find that the user number input has, by far, the highest relative importance factor. Averaging across all of our application tasks, the relative importance factor of the user number is 0.56 (e.g., more than twice as high as the second factor). This strongly demonstrates that the user is one of the most important factors in determining the rating.

Finally, to understand the nature of the relationship between the HPCs and the user satisfaction, some embodiments according to the present invention analyze the trends for different functions for user satisfaction as provided by the user at each of the processor frequencies.

TABLE 3

User trend categorization, the number of users in each category for each application

| Applications | Constant | Linear | Step | Staircase | Other |
|---|---|---|---|---|---|
| Java Game | 0 | 4 | 8 | 4 | 4 |
| Shockwave | 1 | 5 | 7 | 6 | 1 |
| Video | 18 | 0 | 0 | 0 | 2 |

Table 3 summarizes the trends observed among different users for our three applications in accordance with some embodiments of the present invention. The first row shows the trend curves when user satisfaction is plotted against the different frequencies (e.g., along x-axis). Most of the trends can be placed in four major categories:

Constant—User satisfaction remains unchanged with frequency. As a result, it is not affected by frequency setting.

Linear—User satisfaction increases linearly with processor frequency.

Step—User satisfaction is the same for a few high frequencies but then plummets suddenly for the remaining lower ones.

Staircase—User satisfaction takes on discrete values that monotonically increase with increasing frequency.

User satisfaction functions that do not match any of the above categories are labeled Other. Usually, this is due to user feedback which provides a non-monotonic function.

These results reveal several important trends. First, some embodiments according to the present invention contemplate that user satisfaction is often non-linearly related to processor frequency. The majority of users provide functions that are categorized as Constant, Step, or Staircase. Note that although Constant is a linear function, it does not follow the regular assumption that an increase in a given metric results in an increase in user satisfaction. Second, some embodiments according to the present invention contemplate that user satisfaction is application-dependent. For example, for the Video application, almost all of the users report a Constant function. On the other hand, the trends for the Java game are distributed among various categories. Finally, some embodiments according to the present invention contemplate that user satisfaction is user-dependent. For example, in both the Java game, and the Shockwave animation, users specify utility functions that span multiple categories. This shows that different users have significantly different expectations for the system.

As we will discuss below, these observations have a useful effect on the modeling technique used for learning and predicting user satisfaction in accordance with some of the embodiments of the present invention.

Some embodiments according to the present invention contemplate one or more of the following: hardware counters have a strong correlation with user satisfaction; the individual user is one of the most important factors in determining user satisfaction; the relation between hardware performance and user satisfaction is often non-linear; and user satisfaction is both application dependent and user dependent.

Based on these observations, we design, implement, and evaluate a DVFS scheme that is based on individual user preferences in accordance with some embodiments of the present invention.

Based, at least in part, on the initial user study results presented above, a power management scheme is developed that sets the frequency of the processor based on estimates of user satisfaction in accordance with some embodiments of the present invention. Some embodiments according to the present invention provide for a predictive user-aware power management scheme, called Individualized Dynamic Frequency and Voltage Scaling (iDVFS). To implement iDVFS in accordance with some embodiments of the present invention, a system is built that is capable of predicting a user's satisfaction based on interaction with the system. As illustrated in FIG. 1, the system may include, for example, a learning stage and a runtime power management stage.

Learning Stage—The system is initially trained based on reported user satisfaction levels and HPC statistics as described above. Machine learning models, e.g., artificial neural networks, are trained offline to learn the function from HPC values to user satisfaction.

Runtime Power Management—Before execution, the learned model is loaded by the system. During run time, the HPC values are sampled, entered into the predictive model, and then the predicted user satisfaction is used to dynamically set the processor frequency.

In its learning stage, our algorithm builds a predictive model based on individual user preferences in accordance with some embodiments of the present invention. The model estimates user satisfaction from the HPCs. In this stage, the user is asked to give feedback (e.g., provide user satisfaction level) while the processor is set to run at different frequency levels. The nature of this training stage is similar to the user study described above. In some embodiment according to the present invention, the user study and its survey are repeated for each application. While a user study runs, the nine performance counters are collected and the 45 statistical metrics computed from them are extracted. The combination of these values and the user feedback are used to build the model that will later be used online in accordance with some embodiments of the present invention.

In the learning stage in accordance with some embodiments of the present invention, data is gathered that associates an individual user's satisfaction with different hardware performance counter readings and statistics. These instances are then used to build a predictive model that estimates the satisfaction of a particular user from the HPCs. Some embodiments according to the present invention use neural networks to learn this model. Some embodiments according to the present invention use regression models and decision trees. However, the neural networks may provide the highest accuracy.

Some embodiments according to the present invention use an artificial neural network (NN) that is an interconnected group of artificial neurons that uses a mathematical or computational model for information processing based on a connectionist approach to computation. The NN maps a set of p input variables $x_1, \ldots, x_p$ to a set of q response variables $y_1, \ldots, y_q$. It works by simulating a large number of interconnected simple analog processing units that resemble abstract versions of a neuron. Each processing unit (or neuron) computes a weighted sum of its input variables. The weighted sum is then passed through the sigmoid function to produce the units output. Some embodiments according to the present invention use a three-layer NN model with one input layer, one hidden layer, and one output layer. The Backpropagation algorithm is used to train the neural network from instance data. In the Backpropagation algorithm, the weights between the neurons begin as random values. During the learning phase in accordance with some embodiments of the present invention, training inputs are provided to the NN and the associated output errors are used to adjust neuron weight functions to reduce error.

Our experiments represent a very interesting case for machine learning. Typically, machine learning algorithms are extensively trained using very large data sets (e.g., thousands of labeled training inputs). In accordance with some embodiments of the present invention, we would like to use NNs for their ability to learn complex non-linear functions, but do not have a very large data set. For each application-user pair, we only have six training inputs; one for each processor frequency. A training input includes a set of HPC statistics and a user-provided satisfaction label. When we first began building NN models with all 45 inputs (e.g., 9 HPC counters with 5 statistics each), we noticed that our models were overly conservative, only predicting satisfaction ratings within a narrow band of values. We used two training enhancements to permit the construction of accurate NN models. First, we simplified the NN by limiting the number of inputs. Large NNs require large amounts of training data to sufficiently learn the weights between neurons. To simplify the NN, we used the two counters that had the highest correlation, specifically PAPI_BTAC_M-avg and PAPI_TOT_CYC-avg (see, e.g., Table 2). Second, we repeatedly created and trained multiple NNs, each beginning with different random weights. After 30 seconds of repeated trainings, we used the most accurate NN model. These two design decisions were advantageous in allowing us to build accurate NN models.

Some embodiments according to the present invention provide for iDVFS that uses NN models to determine the frequency level. The decision is governed by the following variables: f, the current CPU frequency; $\mu_{US}$, the user satisfaction prediction for the last 500 ms of execution as predicted by the NN model; ρ, the satisfaction tradeoff threshold; $α_f$, a per-frequency threshold for limiting the decrease of frequency from the current f, M, the maximum user comfort level; and $T_i$, the time period for re-initialization.

Some embodiments according to the present invention provide for iDVFS that employs a greedy approach to determine the operating frequency. At each interval, if $\mu_{US}$ is within $α_f ρ$ of M, iDVFS predicts that the frequency is in a satisfactory state. If $\mu_{US}-1$, the previously predicted user comfort, is also within $α_f ρ$ of M, the system determines that it may be good to decrease the processor frequency; if not, then the system maintains the current frequency. If $\mu_{US}$ is not within $α_f ρ$ of M, then the system determines that the current performance is not satisfactory and increases the operating frequency. iDVFS uses the $α_f$ thresholds as a hysteresis mechanism to eliminate the ping-pong effect between two states. If the processor rapidly switches between two states N times in a short time interval, the appropriate $α_f$ threshold is decreased to make it harder to decrease to the lower frequency level. This feature of the algorithm ensures that iDVFS can adjust to a set of operating conditions very different from those present at initialization but at a rate that is maximally bounded by $T_i$. The constant parameters (ρ=0.15, N=3, ρ=20 seconds) were set based on the experience of the authors using the system. $α_f$ thresholds are initialized to one for each of the frequency level and is decremented by 0.1 at each frequency boost.

Some embodiments according to the present invention use contemplate empirically evaluating the sensitivity of iDVFS performance to the selected parameters. However, such a study would have real users in the loop, and thus might be slow. Testing four values of four parameters on 20 users would last 256 days (e.g., based on 20 users/day and 25 minutes/user). For at least this reason, some embodiments according to the present invention provide for parameters that are chosen based on a qualitative evaluation and then "close the loop" by evaluating the whole system with the choices.

Figure 2:
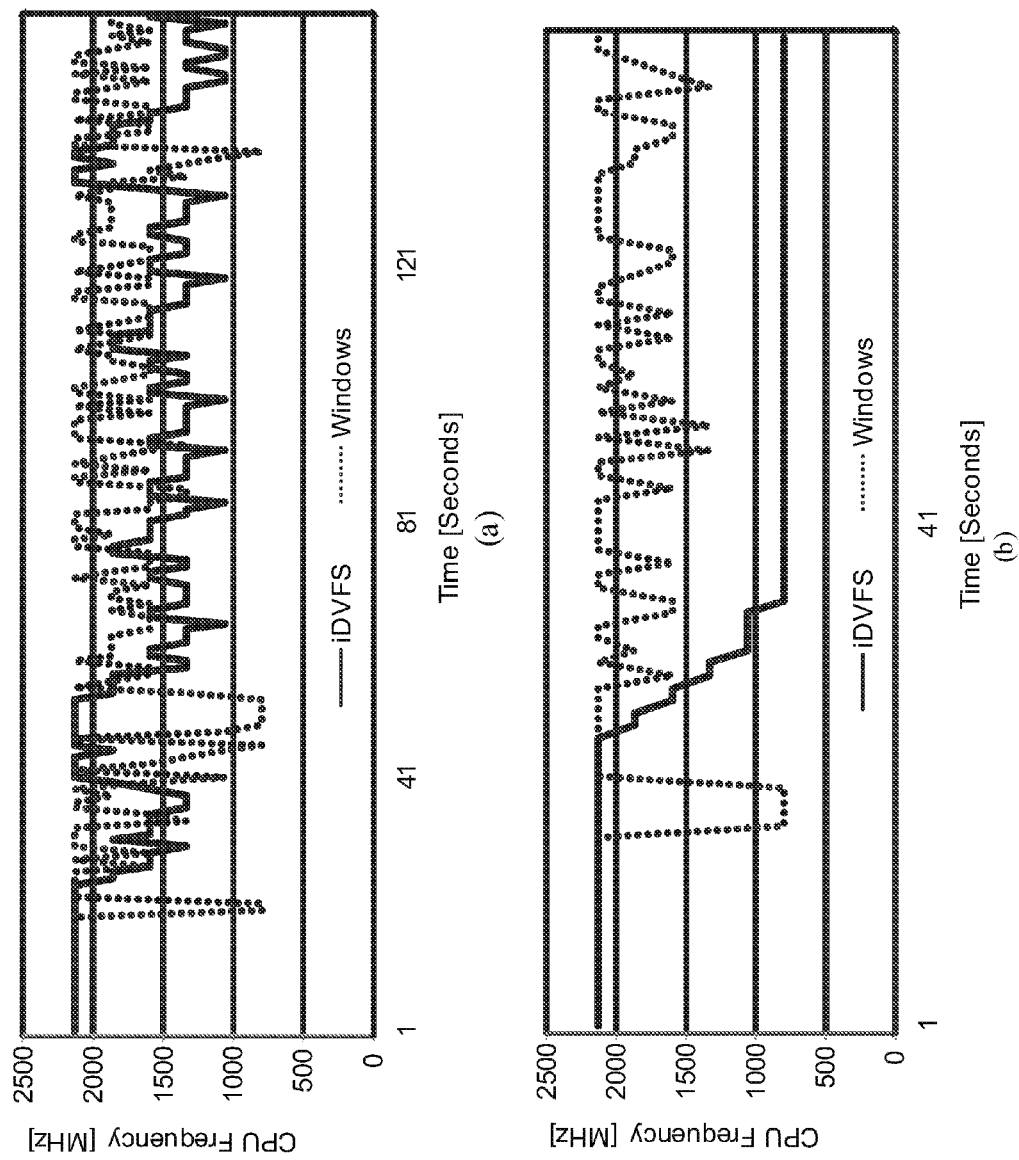
FIG. 2 shows frequency traces using iDVFS and Windows XP DVFS schemes for (a) Java Game and (b) Video according to some embodiments of the present invention.

FIG. 2 illustrates the performance of the iDVFS algorithm for two of the three applications in our study in accordance with some embodiments of the present invention. Each graph shows, as a function of time, the CPU frequency for a randomly-selected user when playing the Java Game and watching the Video. First, note that the frequency transitions in the two example traces differ greatly from the decisions that Windows XP DVFS makes. The reason is that Windows XP DVFS alters frequency based upon CPU utilization while iDVFS alters frequency based upon predicted user satisfaction. iDVFS reduces the frequency significantly in the Video application. In this case, the user has indicated high satisfaction with all levels of performance. As shown in Table 3, the Video has the least variation in user satisfaction values at lower frequencies. As a result the iDVFS algorithm can reduce CPU frequency without affecting user satisfaction. In both cases, the frequency level follows the satisfaction levels reported by the user and minimizes power consumption with little impact on satisfaction. These traces show that iDVFS can successfully adjust the clock frequency throttle according to the user satisfaction derived from the HPCs. For a highly compute-intensive application (e.g., such as the Java Game), the reduction in the frequency is minimal because any change in frequency causes a significant reduction in user-perceived performance. For other applications (e.g., such as the Video), frequency can be drastically reduced without affecting user satisfaction.

Some embodiments according to the present invention contemplate integrating iDVFS with the operating system (OS), while other embodiments according to the present invention do not contemplate integrating iDVFS with the OS. Some embodiments according to the present invention implement client software that runs as a Windows toolbar task, and manually activate iDVFS for our user studies. The client is implemented in a manner that is similar to profile-directed optimization. An initial calibration stage is used for building a model that is used to predict user satisfaction during run time. Some embodiments according to the present invention use direct user feedback in a calibration stage for each user and each application, while others do not use direct user feedback in the calibration stage for each user and each application. While using direct user feedback in a calibration stage for each user and each application may be cumbersome, there are two points we would like to make. First, we believe that the current system is practical for some users (e.g., heavy gamers will not mind a few minutes of calibration). Second, we argue that explicit user feedback is a viable option. However, some embodiments according to the present invention contemplate limiting the feedback and learning effectively from explicit/implicit mechanisms will allow such schemes to be deployed widely.

iDVFS has a few limitations that can be eliminated once iDVFS is integrated into the OS. First, we provide the client software with per-user, per-application neural network models tailored to the application we are about to invoke. Second, iDVFS is intended for interactive applications, although the present invention need not be so limited. Some embodiments according to the present invention provide for an OS that has knowledge of users and applications (e.g., active applications) and that automatically loads the appropriate prediction models for interactive applications during context switches.

Some embodiments according to the present invention provide for WinPAPI that supports system-wide HPC sampling; this includes other programs, background processes, and kernel execution. For our study, we run a single workload on the machine at a time; hence HPC samples correlate to the workload directly. Some embodiments according to the present invention contemplate that the HPC interface would include thread-specific information as well as distinguish between user level and kernel level applications. Other HPC interfaces (e.g., perfmon2 for Linux) may also include this support.

The performance of iDVFS may largely be dependent upon good user input. However, the user is free to provide new ratings and recalibrate iDVFS if the resulting control mechanism causes dissatisfaction.

Below, we evaluate the predictive user-aware power management scheme in accordance with some embodiments of the present invention with a user study, as described above. We compare iDVFS with the native Windows XP DVFS scheme and report reductions in CPU dynamic power, as well as changes in measured user satisfaction. This is followed by a trade-off analysis between user satisfaction and system power reduction. We report the effect of iDVFS on the power consumption and user satisfaction.

We compare iDVFS to Windows Adaptive DVFS, which determines the frequency largely based on CPU usage level. A burst of computation due to, for example, a mouse or keyboard event brings utilization quickly up to 100% and drives frequency, voltage, power consumption, and temperature up along with it. CPU-intensive applications cause an almost instant increase in operating frequency and voltage regardless of whether this change will impact user satisfaction. Windows XP DVFS uses six of the frequency states in the Enhanced Intel Speedstep technology, as mentioned above. Performance requirements are determined using heuristics based on metrics such as processor utilization, current battery level, use of processor idle states, and inrush current events. In the Windows native adaptive DVFS scheme, decisions are made according to the algorithm described in FIG. 3.

To analyze the effect of iDVFS on system power consumption, we perform a second set of user studies in which the users are asked to carry out the tasks described above. This time, the durations of the applications are increased: the Java Game is executed for 2.5 minutes; Shockwave and Video are executed for 1.5 minutes each. The user is asked to execute the application twice, once for Windows XP DVFS and once for iDVFS, which loads the individual neural network model for the user/application before the start of the execution. Once the execution completes, the users are asked to rate their satisfaction with each of the systems on a scale of 1 (e.g., very dissatisfied) to 5 (e.g., very satisfied).

During these experiments, we log the frequency over time. We use these frequency logs to derive CPU power savings for iDVFS compared to the default Windows XP DVFS strategy. We have also measured the online power consumption of the entire system and provide a detailed discussion and analysis of trade-offs between power consumption and user satisfaction.

Figure 4:
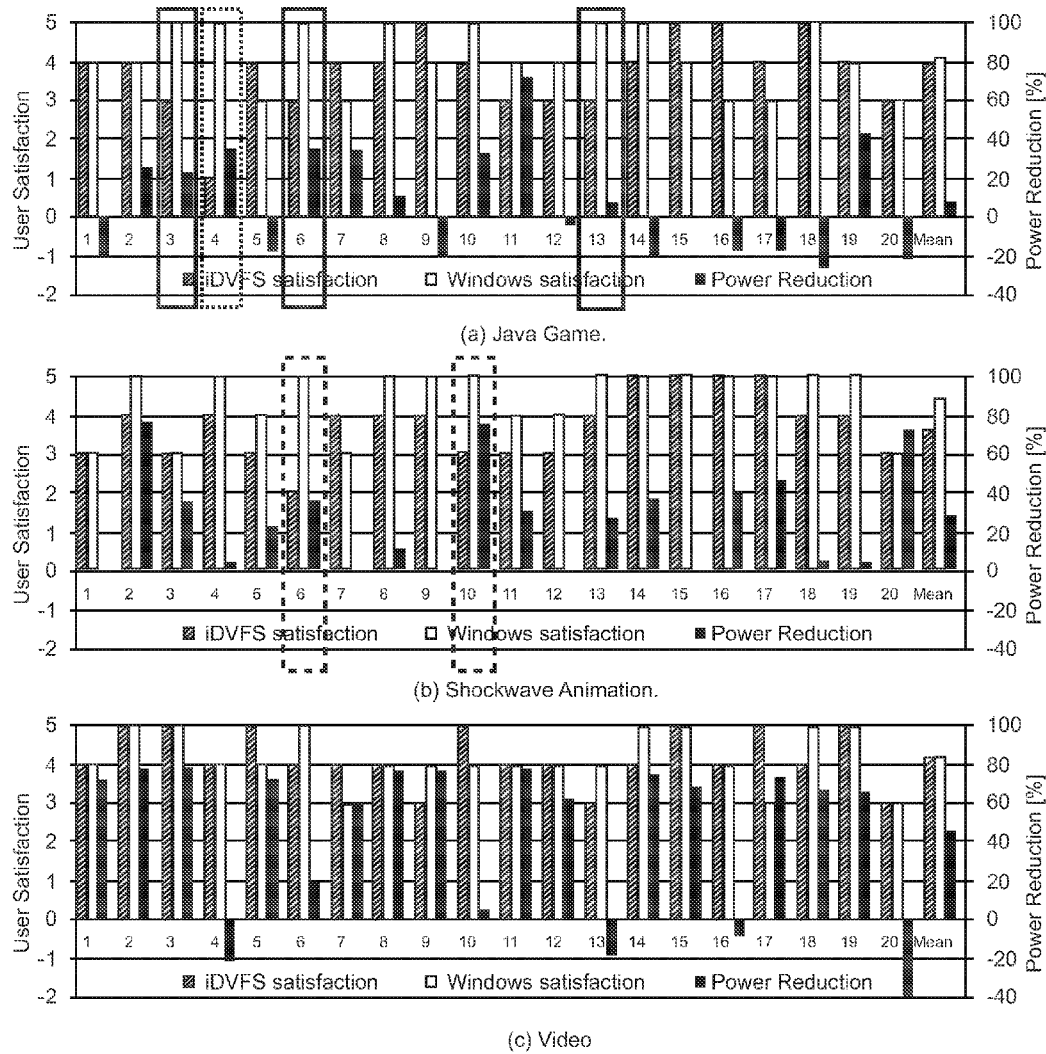
FIG. 4 shows user satisfaction and dynamic power reduction for iDVFS compared to a Windows XP DVFS scheme according to some embodiments of the present invention. In the graphs, the individual users are plotted on the horizontal axis. The left vertical axis reflects the reported satisfaction for iDVFS and Windows XP DVFS, and the right vertical axis reports the percentage reduction in dynamic power of iDVFS compared to Windows XP DVFS.

The dynamic power consumption of a processor is directly related to frequency and supply voltage and can be expressed using the formula $P=V^2CF$, which states that power is equal to the product of voltage squared, capacitance, and frequency. By using the frequency traces and the nominal voltage levels on our target processor, we calculated the relative dynamic power consumption of the processor. FIG. 4 presents the CPU dynamic power reduction achieved by the iDVFS algorithm compared to the Windows XP DVFS algorithm for the individual users for each application in accordance with some embodiments of the present invention. It also presents their reported satisfaction levels. To aid in understanding FIG. 4, consider a group of three bars for a particular user. The first two bars represent the satisfaction levels for the users for the iDVFS (gray) and Windows (white) schemes, respectively. The third bar (black) shows the power saved by iDVFS for that application compared to the Windows XP DVFS scheme (for which the scale is on the right of FIG. 4).

On average, our scheme reduces the power consumption by 8.0% (Java Game), 27.9% (Shockwave), and 45.4% (Video) compared to the Windows XP DVFS scheme in accordance with some embodiments of the present invention. A one-sample t-test of the iDVFS power savings shows that for Shockwave and Video, iDVFS decreases dynamic power with over 95% confidence. For the Java game, there are no statistically-significant power savings. Correspondingly, the average user satisfaction level is reduced by 8.5% (Java Game), 17.0% (Shockwave), and remains the same for Video. A two-sample paired t-test comparing the user satisfaction ratings from iDVFS and Windows XP DVFS indicates that for Java and Video, there is no statistical difference in user satisfaction when using iDVFS. For Shockwave, we reduce user satisfaction with over 95% confidence.

The combined results show that for Java, iDVFS is no different than Windows XP DVFS, for Shockwave, iDVFS trades off a decrease in user satisfaction for a decrease in power consumption, and for the Video, iDVFS significantly decreases power consumption while maintaining user satisfaction.

An analysis of the results quickly reveals that the average satisfaction levels are strongly influenced by a few exceptional cases. We have analyzed the cases where there is a difference of more than 1 step between the user ratings. Among these, we found six cases that require special attention. For the Java Game, the training inputs of Users 3, 6, and 13 (solid rectangles in FIG. 4) significantly mismatched the performance levels of the processor. Specifically, these users have given their highest ratings to one of the lowest frequency levels. As a result, iDVFS performs as the user asks and reduces the frequency, causing dissatisfaction to the user. The cause of dissatisfaction for User 4 (dotted rectangle in FIG. 4) was different. Our neural network for that user did not match the training ratings and thus the user was dissatisfied. Similarly, for the Shockwave application, Users 6 and 10 (dashed rectangle in FIG. 4) provided a roughly constant user satisfaction across the various frequencies. During the user study, however, these Shockwave users highlighted their dissatisfaction when they were able to compare the performance of iDVFS to the Windows scheme, which keeps the processor at the highest frequency at all times It is important to note that such exceptional cases are rare; only 10% of the cases (6 out of 60) fall into this category. Such exceptional cases can be easily captured during a learning phase and eliminated by forcing the user to retake the survey and re-train the model, e.g., training can be repeated until successful. In addition, any dissatisfied user can retrain until a satisfactory performance level is reached. However, our results reveal that such cases will be rare.

We also analyzed the performance of iDVFS without considering these extreme cases. Overall, iDVFS reduces power consumption by 5.2% (Java Game), 24.0% (Shockwave), and 45.4% (Video). User satisfaction levels were increased by 4.8% (Java Game), reduced by 13.9% (Shockwave), and remained identical for Video (where there were no exceptional cases).

User 16's results are likely to be caused by noise and provide a good example of the intricacies of dealing with real users. This user rated iDVFS two steps lower than the Windows scheme for Shockwave. At the same time, he/she rated iDVFS two grades higher for the Java Game application even though iDVFS used a lower frequency throughout execution.

These initial results provide strong evidence that a highly-effective individualized power management system can be developed in accordance with some embodiments of the present invention.

Specifically, the results from our user study reveal that:

there exist applications (e.g., Video) for which providing customized performance can result in significant power savings without impacting user satisfaction;

there exist applications (e.g., Shockwave) for which the users can trade off satisfaction level with power savings; and there exist applications (e.g., Java Game) for which traditional metrics in determining the satisfaction is good and iDVFS will provide the same performance level and user satisfaction.

We have presented experimental results indicating the user satisfaction and the power consumption for three applications. For two applications (Video and the Java Game), we determined that the iDVFS users are at least as satisfied as Windows XP DVFS users. However, for the Shockwave application, we observed that although the power consumption is reduced, this is achieved at the cost of a statistically significant reduction in average user satisfaction. Therefore, a designer needs to be able to evaluate the success of the overall system. To analyze this trade-off, we developed a new metric called the energy-satisfaction product (ESP) that works in a similar fashion to popular metrics such as energy-delay product. Specifically, for any system, the ESP per user/application can be found by multiplying the energy consumption with the reported satisfaction level of the user in accordance with some embodiments of the present invention.

Figure 6:
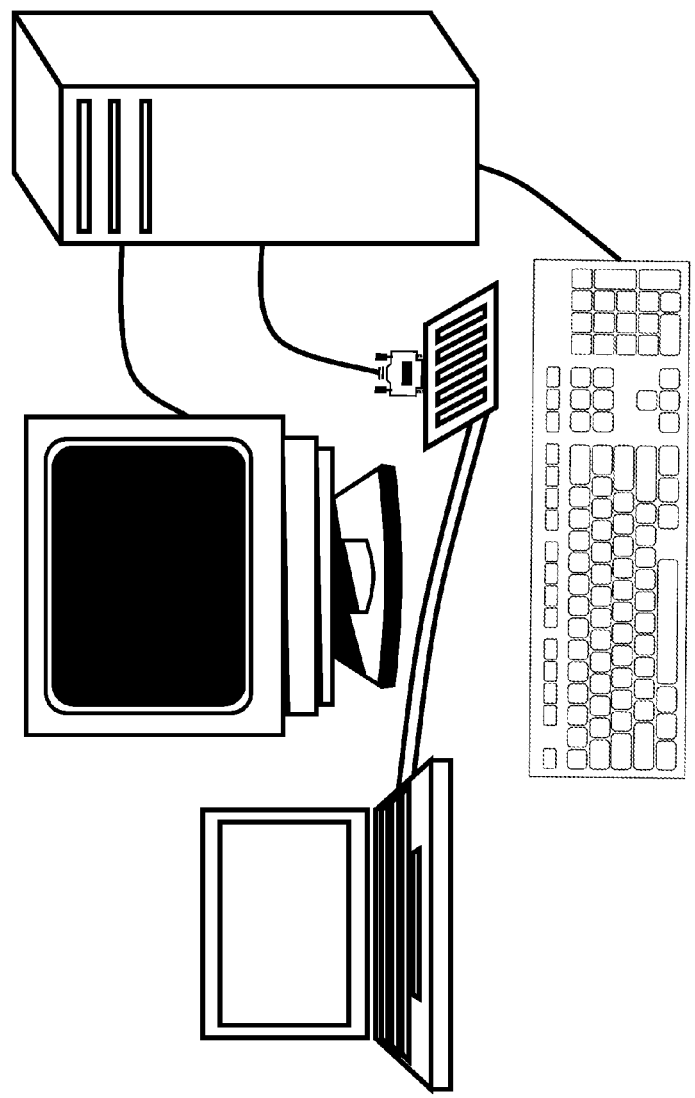
FIG. 6 shows a system power measurement setup according to some embodiments of the present invention.

To make a fair comparison using the ESP metric, we collected the total system energy consumption during the run of the application. To extract these values, we replay the traces from the user studies above. The laptop is connected to a National Instruments 6034E data acquisition board attached to the PCI bus of a host workstation running Windows (and the target applications), which permits us to measure the power consumption of the entire laptop (including other power consuming components such as memory, screen, hard disk, etc.). The sampling rate is set to 10 Hz. FIG. 6 illustrates the experimental setup used to measure the system power in accordance with some embodiments of the present invention.

Figure 5:
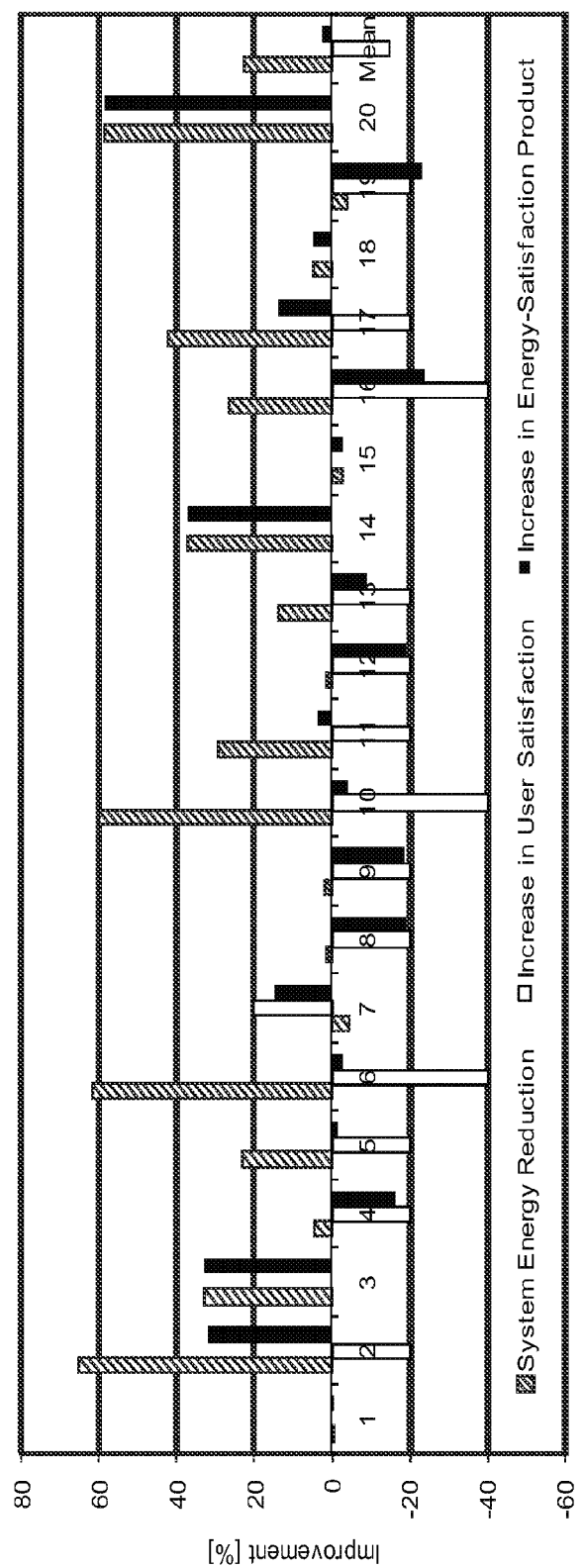
FIG. 5 shows an improvement in energy consumption, user satisfaction, and energy-satisfaction product for the Shockwave application according to some embodiments of the present invention.

Once the system energy measurements are collected (for both Windows XP DVFS and iDVFS), the ESP for each user is determined by multiplying their reported satisfaction levels and the total system energy consumption. The results of this analysis are presented in FIG. 5. FIG. 5 illustrates the reduction in system energy consumption, increase in user satisfaction, and change in ESP for each user. Hence, the higher numbers correspond to improvement in each metric, whereas negative numbers mean that the Windows XP DVFS scheme performed better. Although the ESP improvement varies from user to user, the iDVFS improves the ESP product by 2.7%, averaged over all users. Thus, Windows XP DVFS and iDVFS provide comparable ESP levels for this particular application. In other words, the reduction in user satisfaction is offset at a significant benefit in terms of power savings.

Dynamic voltage and frequency scaling (DVFS) is an effective technique for microprocessor energy and power control for most modern processors. Energy efficiency has traditionally been a major concern for mobile computers. An energy-aware dynamic software management framework has been proposed that improves battery utilization for mobile computers. However, this technique is only applicable to highly adaptive mobile applications. Researchers have proposed algorithms based on workload decomposition, but these tend to provide power improvements only for memory-bound applications. A design framework for a run-time DVFS optimizer in a general dynamic compilation system has been presented. The Razor architecture dynamically finds the minimal reliable voltage level. An adaptive voltage scaling technique that uses a closed-loop controller targeted towards standard-cell ASICs has been proposed. Intel Foxton technology provides a mechanism for select Intel Itanium 2 processors to adjust core frequency during operation to boost application performance. However, none of the previous DVFS techniques appear to consider the user satisfaction prediction.

Other DVFS algorithms use task information, such as measured response times in interactive applications as a proxy for the user. Vertigo monitors application messages and can be used to perform the optimizations implemented in our study. However, compared to Vertigo, our approach provides a metric/framework that is much easier to use. Schemes minimizing energy consumption in real-time embedded systems that execute variable workloads have been proposed. However, they try to adapt to the variability of the workload rather than to the users. A high variation in user tolerance for performance in the scheduling context has been demonstrated, variation that may hold for power management as well.

It has been shown that it is possible to utilize user feedback to control a power management scheme, e.g., allow the user to control the performance of the processor directly. However, the system uses constant feedback from the user. Our scheme correlates user satisfaction with low level microarchitectural metrics. In addition, some embodiments according to the present invention use a learning mechanism to eliminate user feedback to make long-term feedback unnecessary. The concept of a control parameter that could be used by the user have been discussed. However, they focus on the wireless networking domain, not the CPU. Second, they do not propose or evaluate a user interface.

A novel DVFS method based on statistical analysis of performance counters has been proposed. However, the technique use compiler support to insert code for performance prediction. Furthermore, the technique does not consider user satisfaction while setting the frequency. One of the contributions of our work is to establish the correlation between hardware counters and user satisfaction and utilize this correlation to develop a user-aware DVFS technique in accordance with some embodiments of the present invention.

Some embodiments according to the present invention provide for a strong, albeit usually nonlinear, link between low-level microarchitectural performance metrics, as measured by hardware performance counters (e.g., "close to the metal" numbers), and user satisfaction (e.g., "close to the flesh" numbers) for interactive applications. The link is highly user-dependent. This variation in user satisfaction indicates potential for optimization. Using neural networks in accordance with some embodiments of the present invention, per-user per-application functions (which might be called "metal to flesh functions") are learned that map from the hardware performance counters to individual user satisfaction levels. This result in a computer system that can uses small amounts of explicit user feedback, and then implicitly learns from the feedback to make online predictions of user satisfaction. We demonstrate the utility of this implicit feedback by employing it in a user-aware DVFS algorithm. Experimental results, and analysis of user studies, show that there are interactive applications for which knowledge of user satisfaction permits power consumption savings. Others present an interesting trade-off between user satisfaction and power savings. According to some embodiments of the present invention, our system reduces the power consumption of Windows XP DVFS by over 25%, while only affecting user satisfaction in one application.

Some embodiments according to the present invention provide support for dynamic voltage and frequency scaling in processors used in battery-powered portable systems. Typical dynamic CPU frequency scaling techniques generally use high CPU utilization as an indication of the requirement to increase CPU frequency. These techniques ignore at least one of the goals of any computer system, which to satisfy its users. In reality, performance requirements vary among users and applications. For many interactive applications, perceived performance is highly dependent upon the user, and is not linearly related to CPU utilization. This observation reveals an opportunity for reducing power consumption in accordance with some embodiments of the present invention.

Some embodiments according to the present invention provide for Human and Application driven frequency scaling for Processor Power Efficiency (HAPPE). In some embodiment according to the present invention, HAPPE comprises an adaptive user-and-application-aware dynamic CPU frequency scaling technique. HAPPE adapts processor frequency to the performance requirement of the current user and application.

In accordance with some embodiments of the present invention, we have evaluated HAPPE on a Linux-based laptop, and have conducted user studies with 24 users and four interactive applications. Compared to the default Linux CPU frequency controller, HAPPE provides the same satisfaction level to users but reduces measured system wide power consumption by 25% on average.

Power efficiency is a technology driver in the area of battery-powered mobile and embedded systems such as, for example, mobile phones, personal digital assistants, MP3 players, and laptops. Processor power consumption has a substantial impact on the power consumption of high-performance portable systems, which tend to include multiple processors and coprocessors. Our measurements indicate that reducing the processor power consumption in accordance with some embodiments of the present invention can save, for example, up to 40% of the overall system power consumption on a modern laptop.

Some embodiments according to the present invention provide for dynamic frequency and voltage scaling (DVFS) as a power reduction technique for a processor. DVFS changes the frequency and voltage of a processor at runtime to trade off power consumption and performance. Most existing DVFS techniques such as those used in the Linux and Windows operating systems determine the appropriate processor frequency based on current CPU utilization. These approaches use CPU utilization as a measure of required performance. Therefore, to guarantee high performance, they only allow a decrease in frequency when CPU utilization is below a certain threshold, e.g., 80%.

These traditional approaches ignore one of the goals of any computer system which is to satisfy its users, not to deliver a particular required processor performance (e.g., the number of instructions executed per second). Although CPU utilization is a good indication of processor performance, the actual perceivable performance is highly dependent upon individual users and applications, and is not linearly related to the CPU utilization level. We conducted a study on 10 users with four interactive applications and found that for some applications, some users are satisfied with the system performance when the processor is at the lowest frequency, while other users may not be satisfied even when it operates at the highest frequency. We also found that users may be insensitive to the performance at different frequency levels for one application, but may be very sensitive to performance differences for another application. Traditional DVFS policies that consider only CPU utilization or other user-oblivious performance metrics are usually too pessimistic about user performance requirements, and are generally forced to use a high performance level in order to satisfy all users, resulting in wasted power.

Some embodiments according to the present invention provide HAPPE that is a new CPU DVFS technique that adapts voltage and frequency to the performance requirement of the current user and application. HAPPE associates individual users and applications at different CPU utilization levels with the lowest frequency that satisfies the user. HAPPE decides user satisfaction, for example, by taking direct user keyboard input. However, it does not require continuous explicit user feedback, and uses a short training period the first time a user runs an application. Then, for each user and application, HAPPE saves the required CPU frequency at different utilization levels, and automatically loads this information upon later invocation of the application. After the training period, the user is not required to provide additional feedback, but may occasionally send new inputs to change the control policy, if desired.

Some embodiments according to the present invention provide HAPPE as a user-space CPU frequency governor for Linux. We compared it to the Linux default ondemand frequency governor. To find out whether HAPPE can save more power, but still satisfy the user, we conducted a study on 24 users with four representative interactive applications for portable systems such as smart phones and laptops. All these applications are highly CPU intensive. We averaged the measured system power consumptions and user satisfaction ratings for all users and applications. Compared to the ondemand governor, HAPPE in accordance with some embodiments of the present invention reduced the overall system power consumption, for example, by 25% without degrading user satisfaction. This reduction is substantial, considering that the highest possible system-wide power reduction by constantly scaling frequency from the highest level to the lowest level is 40.63%, when the CPU utilization is above 80% (the average for our testing applications).

Some embodiments according to the present invention provide for DVFS as a power reduction technique for processors. Traditional DVFS policies use CPU utilization as the metric to determine when to change frequency. It has been proposed to use other hardware performance information available to the operating system to make frequency decisions. It has been proposed to change CPU frequency based on workload decomposition, which tends to provide power improvements only for memory-bound applications. A design framework has been proposed for a run-time DVFS optimizer in a general dynamic compilation system. A DVFS scheme has been proposed that captures the variability of workloads by the probability distribution of the computational requirement of each task in the system. However, none of these techniques considered user satisfaction to control power state as contemplated by some embodiments of the present invention. However, several other techniques proposed to consider user perception in DVFS policy. There are, in general, three types of approaches.

Explicitly obtaining user input, e.g., by monitoring mouse movement or keyboard events: It has been found that different types of user interface events such as mouse movements, mouse clicks, and keystrokes trigger tasks with significantly different CPU requirements, suggesting that DVFS algorithms should adjust speeds based on interface events. A DVFS scheme has been proposed that controls processor frequency by monitoring continuous explicit user input via keyboard events. This simple control policy is completely user-driven and does not make use of any CPU performance information. It does not learn user preferences for particular applications, and requires ongoing explicit feedback from users to maintain adequate performance, which may eventually annoy users, thereby preventing practical use.

Implicitly estimating user perception by measuring metrics such as the response latency in interactive applications as a proxy for the user: Application messages have been monitored to measure user-perceived latency. The delay between user input and computer response has been defined as a measure of user-perceived latency. Measurements of variations in the rate of change of video output have been used to estimate user-perceived performance. These techniques ignore the variation among users and applications: they use the same threshold for all users and applications. A DVFS scheme has been proposed that uses a neural network model to predict user satisfaction by hardware performance counter readings. This technique uses an off-line training stage for each user and each application, which runs the application at different frequency level and asks the user for a verbal satisfaction rating.

Implicitly inferring user satisfaction by monitoring the status of biometric sensors on the user: The addition of biometric input devices for gathering information about user physiological traits have been proposed. On average, an aggressive version of this DVFS scheme, PTP, reduces the total system power consumption of a laptop by 18.1% and a conservative version reduces the total system power consumption by 11.4%. This approach requires specially designed biometric sensors to be put on the users and it remains to be seen how easily these sensors can be integrated into computer systems and normal workflows. In contrast, HAPPE requires no additional hardware and improves system power consumption by 25%.

CPU utilization has been used as a proxy for required performance. In traditional CPU DVFS policies, it is used as the metric to determine CPU frequency. To guarantee high processor performance, these policies only decrease frequency when CPU utilization is below a certain threshold, e.g., 80%. However, processor performance is not identical to user-perceived performance. Do different users have the same performance requirement for the same application? Does one user have the same performance requirement for different applications? To find out, we conducted a user study with 10 users on a Lenovo Thinkpad T61 laptop, which has an Intel Core 2 Duo processor, 2 GB memory, and runs OpenSuse 10.3 and Linux 2.6.22 kernel. Linux supports five frequencies for this processor: 0.8 GHz, 1.2 GHz, 1.6 GHz, 2.2 GHz, and 2.3 GHz, and scales voltage automatically with frequency. The scale of this first user study was kept small because each evaluation took about one hour. We conducted a larger scale second study with 24 users to evaluate HAPPE, which is presented below.

We used four Linux interactive games as our testing applications: Torcs, a 3D car racing game; Quake3, a 3D shooting game; Glest, a 3D real-time strategy game; and Trackballs, a 3D ball maze game. We chose to use these games as our testing applications because they represent typical interactive applications on portable systems and they are usually CPU intensive with high power consumptions.

In the user study, each user played these games at all five frequency levels. The user studies were double-blind and randomized, e.g., the order of frequencies was randomized to eliminate any possible "first-time execution" impact. Each play lasted for at least 2 minutes, and users were permitted to play as long as they desired to evaluate the responsiveness/performance of the system. After each play, users were prompted to enter their "satisfaction level with the system responsiveness/performance on a scale of 1 to 5, where 5 is the most satisfied and 1 is the least satisfied." While users were playing the game, a program ran in the background to sample utilization level for both CPUs on the laptop. Because our test platform has two CPUs, in all user studies the testing application being evaluated is scheduled to run on CPU0 using the Linux taskset utility.

Figure 7A:
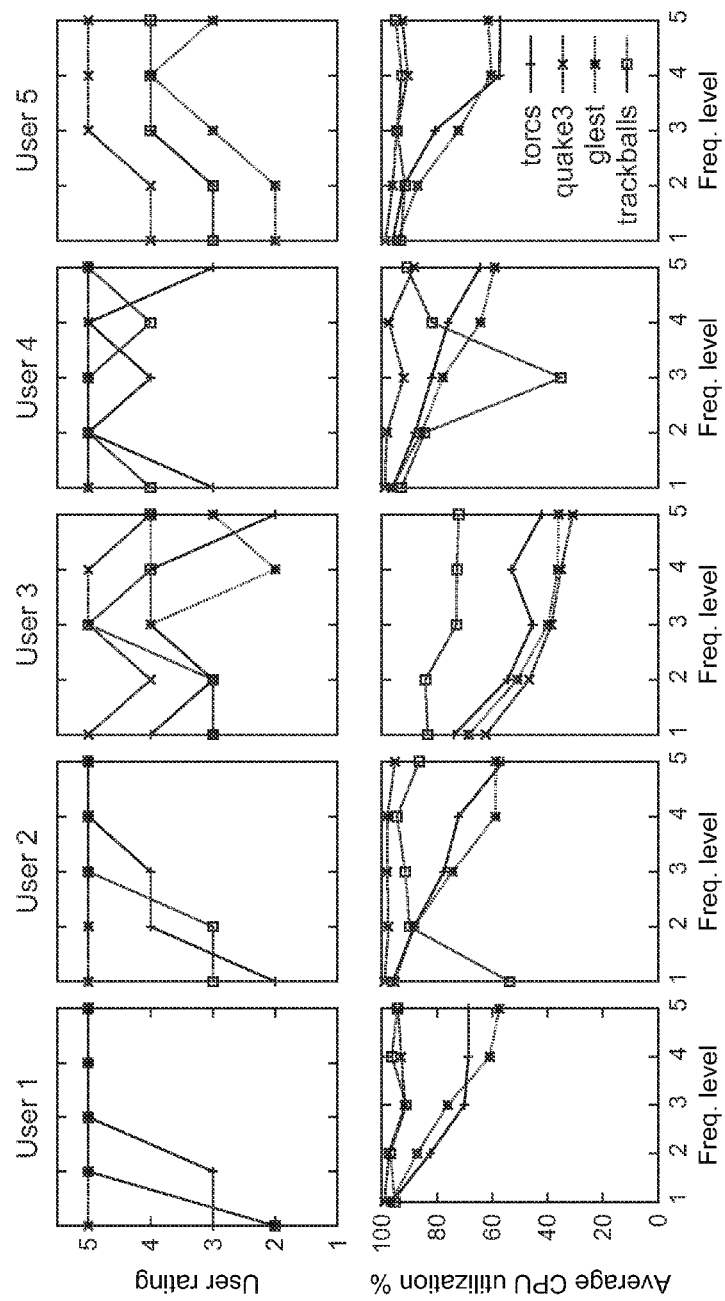
FIG. 7 shows satisfaction rating and CPU utilization of 10 users at 5 different frequency levels according to some embodiments of the present invention.
Figure 7B:
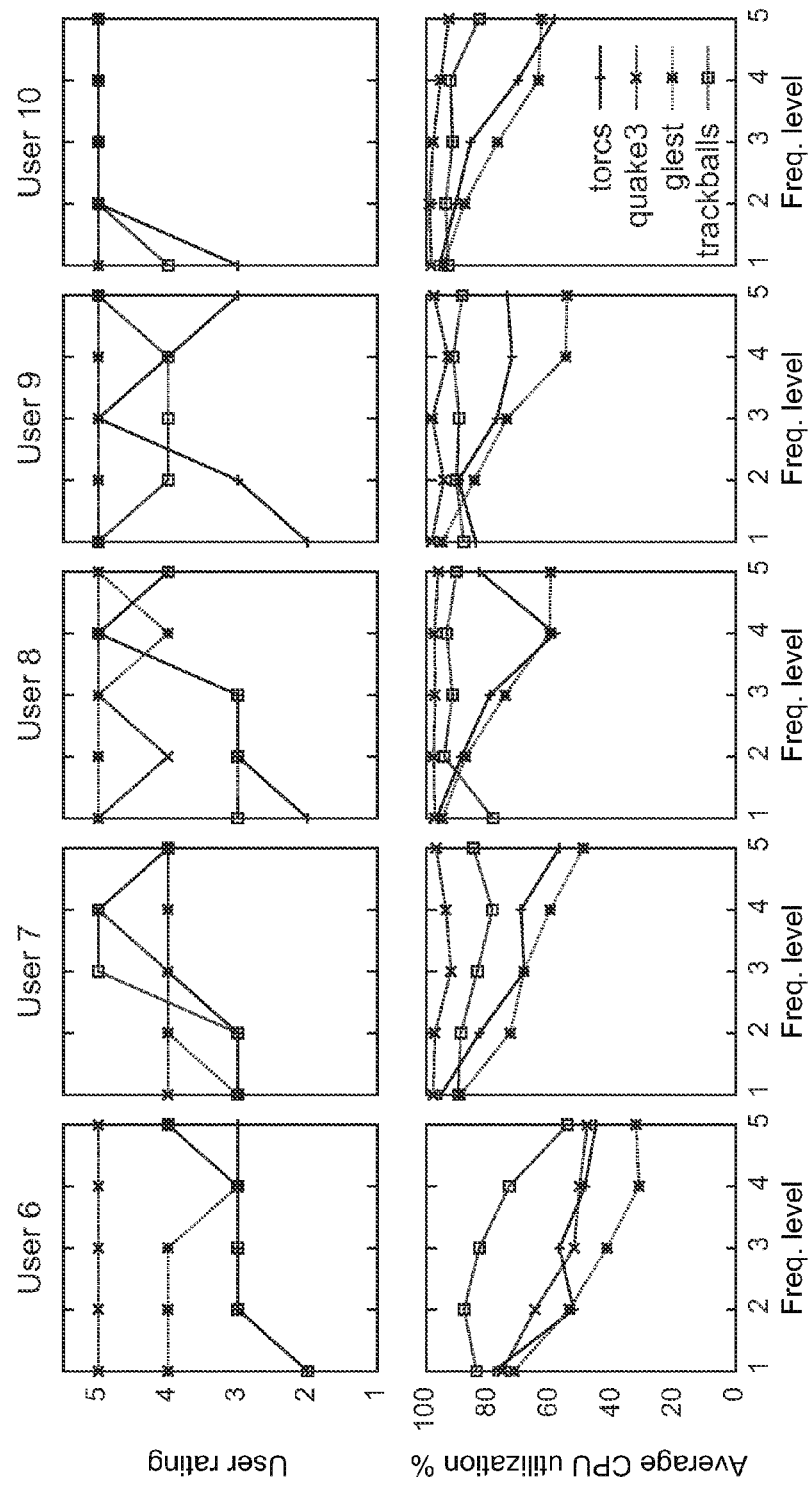

FIG. 7 illustrates (1) the satisfaction ratings of 10 users at five frequency levels, where level 1 represents the lowest frequency (0.8 GHz) and level 5 represents the highest (2.3 GHz), and (2) the average utilization of CPU0 (the CPU that is actually running the task), obtained by sampling the CPU utilization every second during the user study for each user. As shown in FIG. 7, all four applications are CPU intensive. In general, CPU utilization decreases as frequency increases; user satisfaction appears to be a monotonic function of frequency. However, this function is non-linear, and differs greatly among users and applications. Our results provide evidence that conventional DVFS policies that only use CPU utilization as the control metric, ignoring variation among users and applications, are likely to either annoy users or waste power.

An objective of HAPPE is to minimize power consumption without degrading user-perceived performance in accordance with some embodiments of the present invention. For user-interactive systems in accordance with some embodiments of the present invention, an optimal frequency for a current application at a current CPU utilization level is a lowest frequency necessary to satisfy a current user. To approximate the optimal frequency, HAPPE learns user preferences and obtains user feedback by monitoring key-press events for two special keys: the performance key and the power key, which can be mapped to any two keys or key combinations on the keyboard. Users may press the performance key when the responsiveness/performance of the system does not meet their requirements. They may also press the power key when they are satisfied with performance and want to save power.

| Algorithm 1 HAPPE frequency scaler (l) and w_map function (r) |
| --- |

```
for each sample period P_t do              Input: user, app, f_next, ũtil
    f_next = f_cur                            map[user][app][ũtil] = f_next
    if performance key pressed then           for all u > ũtil do
        f_next = f_cur + 1                        if map[user][app][u] <
        w_map(user, app, f_next, ũtil)                f_next
    else if power key pressed then                then
        f_next = f_cur - 1                            map[user][app][u] =
        w_map(user, app, f_next, ũtil)                    f_next
    else                                          end if
        f_next = r_map(user, app, ũtil)       end for
    end if                                    for all u < ũtil do
    if f_next ≠ f_cur then                        if map[user][app][u] >
        set_freq(f_next)                              f_next
    end if                                        then
end for                                           map[user][app][u] =
                                                      f_next
                                              end if
                                          end for
```

For each user in accordance with some embodiments of the present invention, HAPPE creates a user application frequency profile for every interactive application the user executes. The frequency profile distinguishes between applications as well as users. Consider the example of user 6 in FIG. 7. If the frequency profile for Quake3, for which the lowest frequency satisfies the user, is used for Torcs or Trackballs, the user will be very unsatisfied.

We indicate the highest CPU frequency with $f_{max}$, the current frequency with $f_{cur}$, and the current CPU utilization with util. A normalized CPU utilization may be defined as follows: $\widetilde{util} = util \cdot f/f_{max}$. The user application frequency profile divides the normalized CPU utilization into ten discrete levels, e.g., 6%-10%, 10%-20%, and maps a user-satisfactory frequency to each level. The frequencies at all normalized utilization levels are initialized to the lowest frequency. Then, every sample period (P), e.g., one second, HAPPE refreshes the frequency for the next sample period ($f_{next}$), and updates the corresponding frequency profile if necessary.

The detailed algorithm HAPPE uses to control processor frequency is presented in Algorithm 1. HAPPE determines $f_{next}$ by checking user feedback in the last sample period and looking up the corresponding frequency profile entry (the r_map function) based on normalized CPU utilization $\widetilde{util}$ current user (user), and current application of focus (app). If neither performance key nor power key was pressed in the last sample period, HAPPE uses the frequency profile to determine the frequency that previously satisfied the user at the current normalized utilization level, and adjusts the CPU voltage and frequency appropriately. If HAPPE detects that the performance key was pressed in the last sample period, it increases CPU frequency by one level. Otherwise, if HAPPE detects that the power key was pressed in the last sample period, it decreases CPU frequency by one level. Then, HAPPE updates the corresponding frequency profile entry using the w_map function presented in Algorithm 1. Based on the data presented above, we assume that for the same user and application, lower CPU utilization levels require equal or lower CPU frequencies. Therefore, HAPPE not only updates the current normalized utilization level, but also checks to make sure that all utilization levels that are higher than the current level have at least the same frequency, and that all utilization levels that are lower than the current level have at most the same frequency.

Unlike previous work that requires continuous explicit user feedback, some embodiments of the present invention provide for HAPPE that uses a short, implicit, training period the first time a user runs an application. This training period is not separated from normal application use: users may actively use the application during training and need not restart the application when training is finished. During the training period, the user need only use a few keystrokes to find the satisfactory frequency level.

Then, in accordance with some embodiments of the present invention, for each user and application, HAPPE learns the user required CPU frequencies at different utilization level using the frequency profile, and automatically loads the profile upon later invocation of the application. After the training period, the user is not required to provide additional input, but is permitted to do so if desired.

Some embodiments of the present invention implement HAPPE as a user-space CPU frequency governor for Linux. The governor program uses Pthreads to create two threads: $T_1$ and $T_2$. The first thread ($T_1$) polls CPU utilization every second, checks for user input signals from the second thread ($T_2$), and scales frequency and updates the user application frequency profile when necessary. $T_2$ monitors keyboard events, and sends a signal to $T_1$ when the performance key or power key is pressed.

There are a few additional details that may be noteworthy when implementing HAPPE:

Some users may send a burst of key presses when they are unsatisfied with performance, without waiting to observe performance improvement. This would result in moving to the highest frequency, which may not be necessary to satisfy the user. To prevent this, some embodiments of the present invention treat all series of key presses within intervals smaller than one second as a single key press.

For multiprocessor systems, some embodiments of the present invention provide that HAPPE manages each CPU individually if its frequency can be changed independently. If the processors must share the same frequency due to hardware limitation, some embodiments of the present invention provide that HAPPE manages the frequency of the group based on the highest utilization within it.

For multi-process systems, some embodiments of the present invention provide that HAPPE monitors the current interactive application of focus, e.g., the current active X-window application, and updates this application's frequency profile. Some embodiments of the present invention provide that HAPPE guarantees that at any time CPU frequency satisfies the user running the current interactive application.

For portable systems such as laptops and smart phones, it is unlikely that multiple users would be running CPU intensive applications on the system simultaneously. However, if this occurs, some embodiments of the present invention provide that HAPPE follows the same policy and creates a frequency profile for each user and application combination. At any given time, for example, some embodiments of the present invention provide that HAPPE sets the highest frequency necessary to satisfy all current users.

To evaluate the use of HAPPE in accordance with some embodiments of the present invention, we conducted a study on 24 users running the four Linux interactive games described above. We compare the power savings achieved by HAPPE with that of the Linux ondemand governor and show that the user satisfaction is almost identical. We also present extensive analysis on user and application variations, and discuss the impact of providing users feedback on power consumption.

Figure 8:
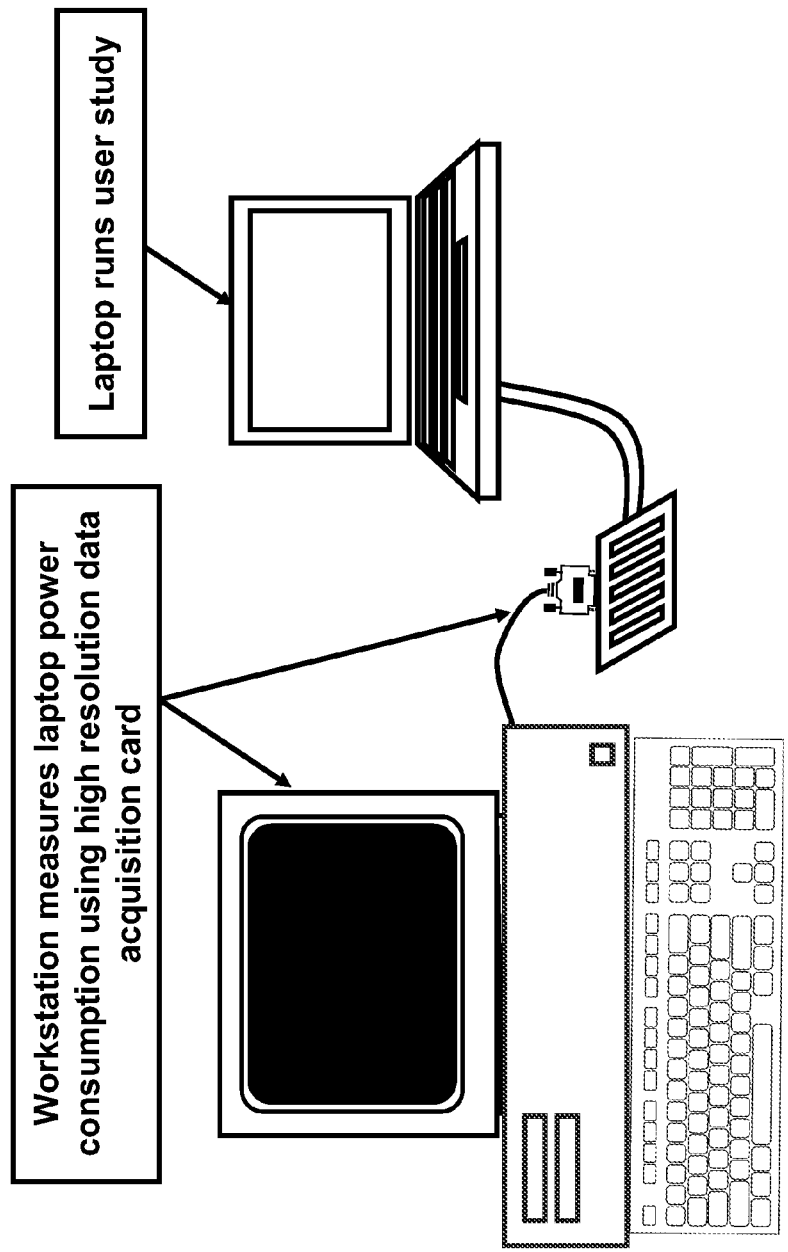
FIG. 8 shows a setup for power measurements according to some embodiments of the present invention.

All our experiments were performed on the Lenovo Thinkpad T61 laptop described above. The frequencies of the two cores in this laptop must scale together. We connected the T61's DC power supply in series with a 100 mΩ Ohmite Lo-Mite 15FR025 molded silicone wire element current sensing resistor. Then we measured the voltage across the resistor to obtain the current of the laptop, using a National Instruments 6034E data acquisition board attached to the PCI bus of a host workstation running Linux. This allows us to measure the power consumption of the entire system (including other components such as memory, graphic card, LCD display, and hard disk). Our power measurement setup is illustrated in FIG. 8. During all experiments, the back-light of the LCD display is set to maximum brightness. Although our technique focuses on reducing CPU power consumption, we measured the power consumption of the whole system, because one of the objectives of some of the embodiments of the present invention is to improve the battery life for portable systems, which is decided by the overall system power consumption, not the CPU power consumption alone. In addition, reduced processor frequency can reduce the demands on other devices, and therefore their power consumptions.

When the performance key is pressed, the user receives almost immediate positive feedback via change in performance. However, when the power key is pressed, the user does not normally receive feedback on benefits for a long period of time: the positive effect is increased battery life. In real-world scenarios, users have an incentive to save power when their laptops or other portable devices are running on battery, but the benefits come at a longer time scale (many hours before the impact on battery life is known) than practical in a user study (2 minutes for each evaluation). It has been found that making battery life information visible to end users has a strong impact on power management for mobile devices.

Figure 9:
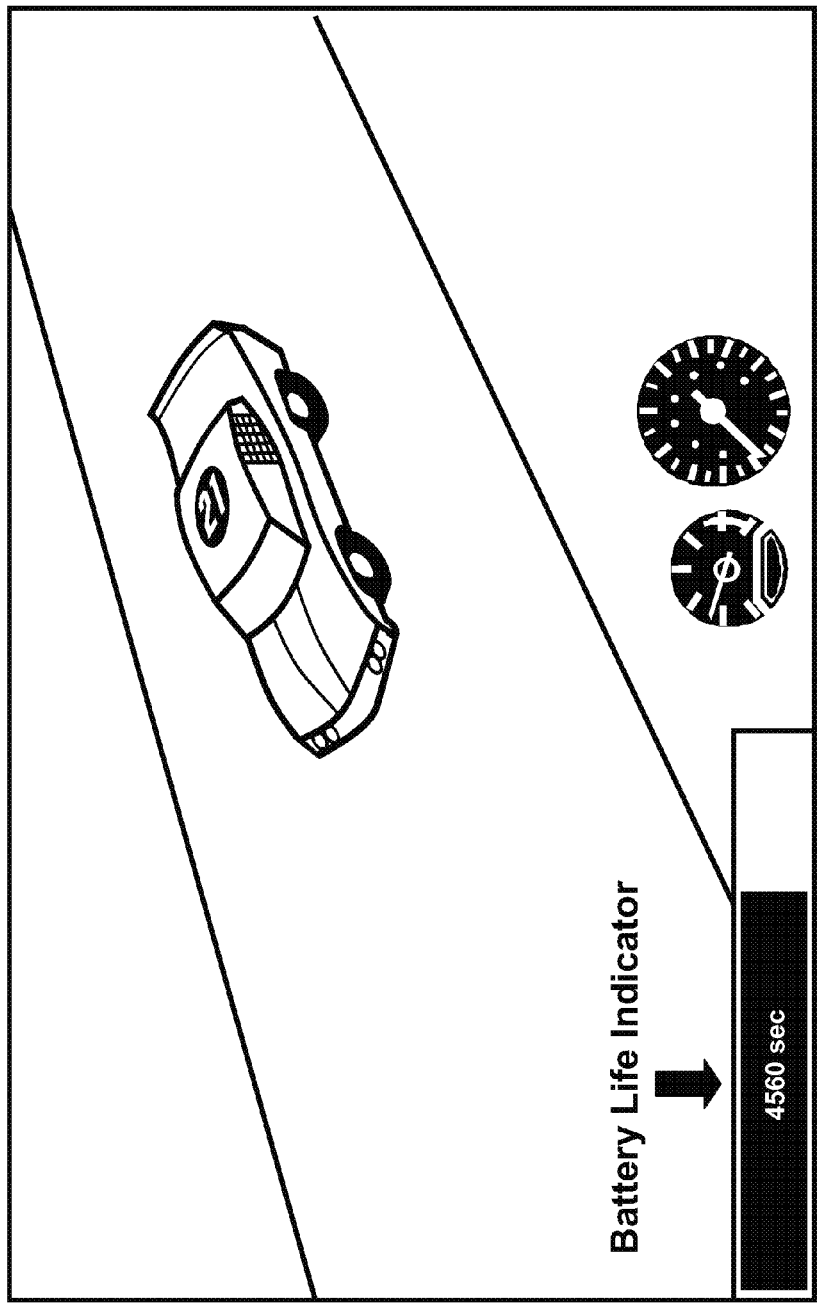
FIG. 9 shows a screenshot including a battery life indicator according to some embodiments of the present invention.

In our user studies, to allow feedback on both performance and power consumption, we designed a graphical battery life indicator in accordance with some embodiments of the present invention, which is displayed in the bottom-left corner of the screen, as shown in FIG. 9. To approximate the real-world scenario, we control the indicator with simulated battery that is designed to last for approximately two hours when the processor is at the lowest frequency and approximately 70 minutes when the processor is at the highest frequency. The indicator displays the remaining operating time based on current battery energy and power consumption, obtained from an on-line power model based on the measured power consumption in Table 4.

Note that HAPPE does not require the use of the battery life indicator. In our evaluation, we tested HAPPE both with and without using the battery life indicator to find out how providing feedback of power to users changes their power management decisions in accordance with some embodiments of the present invention.

The 24 users are graduate and undergraduate university students; they span a wide range of professional backgrounds, races, ages, and computer and gaming experience levels. Each user evaluation lasted about 40 minutes. Prior to each evaluation, the user was asked to fill out a questionnaire indicate a level of experience with computers and computer games using one of the following levels: beginner, moderate, and master. Then the user read a handout with the instructions for the experiment. The users were also shown how the games are played, and were permitted to practice until they were able to play on their own.

In the user study, each user plays each of the four games four times, denoted as ondemand, T-HAPPE, 0-HAPPE, and B-HAPPE. Each time, the game is played for two minutes and then exits automatically. Afterwards, the users are prompted to enter their "satisfaction level with the computer performance/responsiveness on a scale of 1 to 5, where 5 is the most satisfied and 1 is the least satisfied". During the first run, users play the game normally. CPU frequency is controlled by the Linux ondemand frequency controller, with the sample_rate set to 80,000 and the up_threshold set to 80%. During next three runs, HAPPE is used to control CPU frequency. Users may press a green-colored key to require higher performance or better responsiveness, or press a yellow-colored key to save power when they are satisfied with the current performance. Note that users are not required to press either key.

The differences between the three phases are described below.

T-HAPPE is the training phase. During this phase, the frequencies at all utilization levels are initialized to the lowest level and adjusted when the two special keys are pressed. This phase is separated from the following phase to determine whether more frequent feedback during this phase annoys users.

During O-HAPPE, HAPPE loads the user application frequency profile created during T-HAPPE and controls frequency accordingly. The user may still press the two keys to adjust performance. However, the frequency of user interaction is likely to be lower, and better approximate HAPPE in normal use.

During B-HAPPE, the user is provided with a battery life indicator to get feedback on energy use. It is otherwise equivalent to O-HAPPE.

Figure 10:
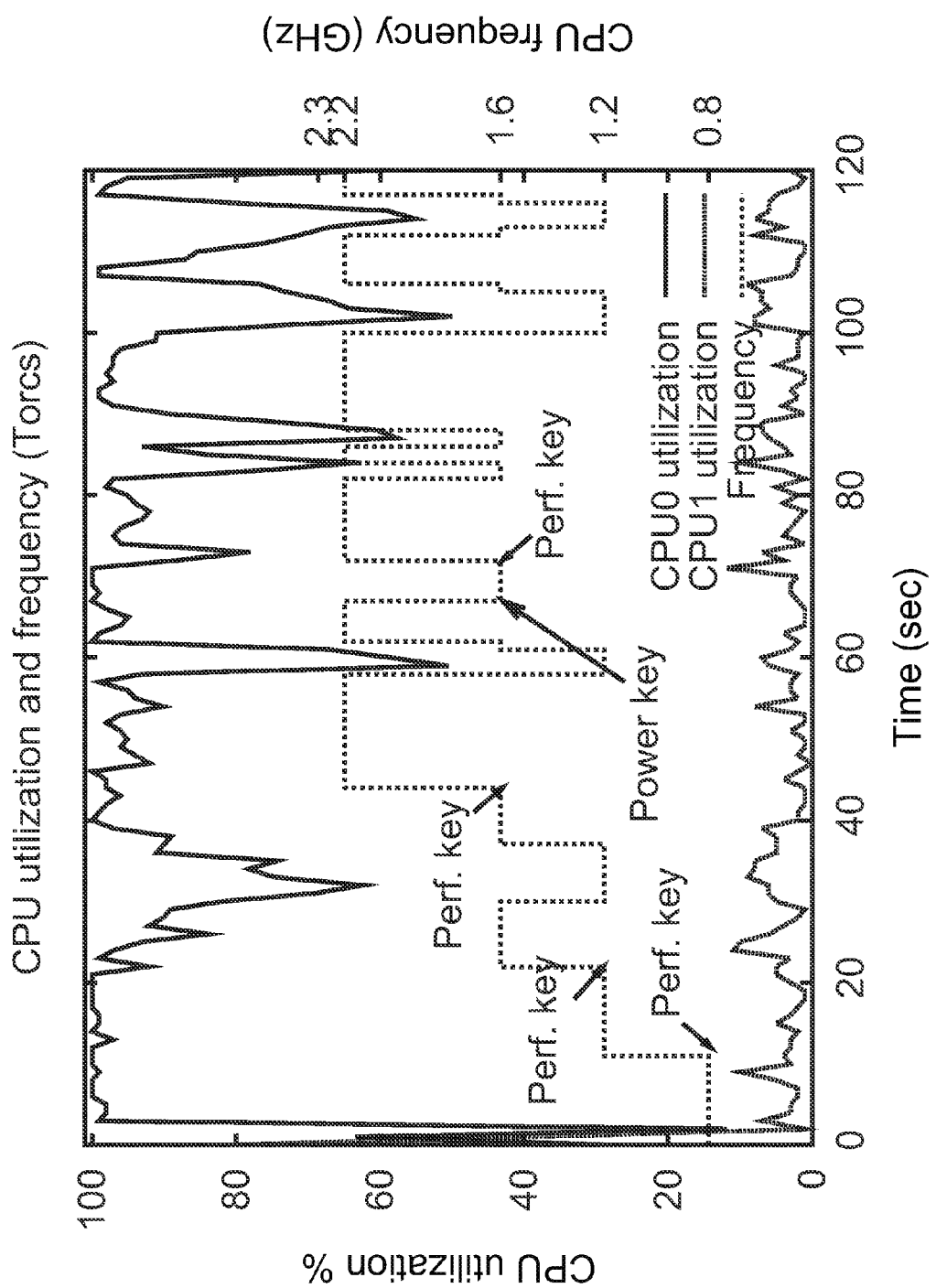
FIG. 10 shows an exemplary HAPPE training phase according to some embodiments of the present invention.

To illustrate dynamic system behavior and user interaction with HAPPE, FIG. 10 shows the time series data of a ran-

TABLE 4

SYSTEM-WIDE POWER CONSUMPTION OF T61 AT DIFFERENT CPU UTILIZATION LEVELS AND FREQUENCIES

| | Power Consumption (Watts) | | | | | | | | | | |
| --- | --- | --- | --- | --- | --- | --- | --- | --- | --- | --- | --- |
| | 0% | 10% | 20% | 30% | 40% | 50% | 60% | 70% | 80% | 90% | 100% |
| 0.8 GHz | 24.40 | 24.80 | 25.22 | 25.03 | 25.37 | 25.81 | 25.81 | 26.41 | 26.60 | 26.69 | 26.74 |
| 1.2 GHz | 25.73 | 26.02 | 26.34 | 25.95 | 26.92 | 27.40 | 27.80 | 27.92 | 27.94 | 28.15 | 28.55 |
| 1.6 GHz | 26.14 | 26.73 | 27.30 | 27.93 | 28.55 | 29.51 | 29.86 | 30.00 | 30.50 | 31.19 | 32.27 |
| 2.2 GHz | 29.35 | 30.01 | 30.81 | 31.91 | 32.77 | 33.79 | 34.87 | 36.00 | 37.25 | 38.52 | 40.18 |
| 2.3 GHz | 30.72 | 32.01 | 33.07 | 34.75 | 35.55 | 36.78 | 39.06 | 40.52 | 42.24 | 43.62 | 45.04 | domly-selected user playing the Torcs car racing game under the control of HAPPE during the training phase in accordance with some embodiments of the present invention. FIG. 10 shows the utilization of both CPUs, the frequency sampled every second, and key press events. When the user started playing the game, frequency was set to the lowest level: 0.8 GHz. After 16 seconds, the user pressed the performance key. HAPPE increased the frequency to 1.2 GHz, and recorded the frequency requirement of the user at this utilization level in the frequency profile. Then, the user pressed the performance key again at 22 seconds and 43 seconds, further increasing the frequency to 2.2 GHz. At 67 seconds, the user pressed the power key and presumably soon realized that the resulting degradation in performance was not tolerable. The user therefore pressed the performance key after 7 seconds. Afterwards, frequency stayed at 2.2 GHz for high CPU utilization levels, and 1.2 GHz for low CPU utilization levels.

Figure 11:
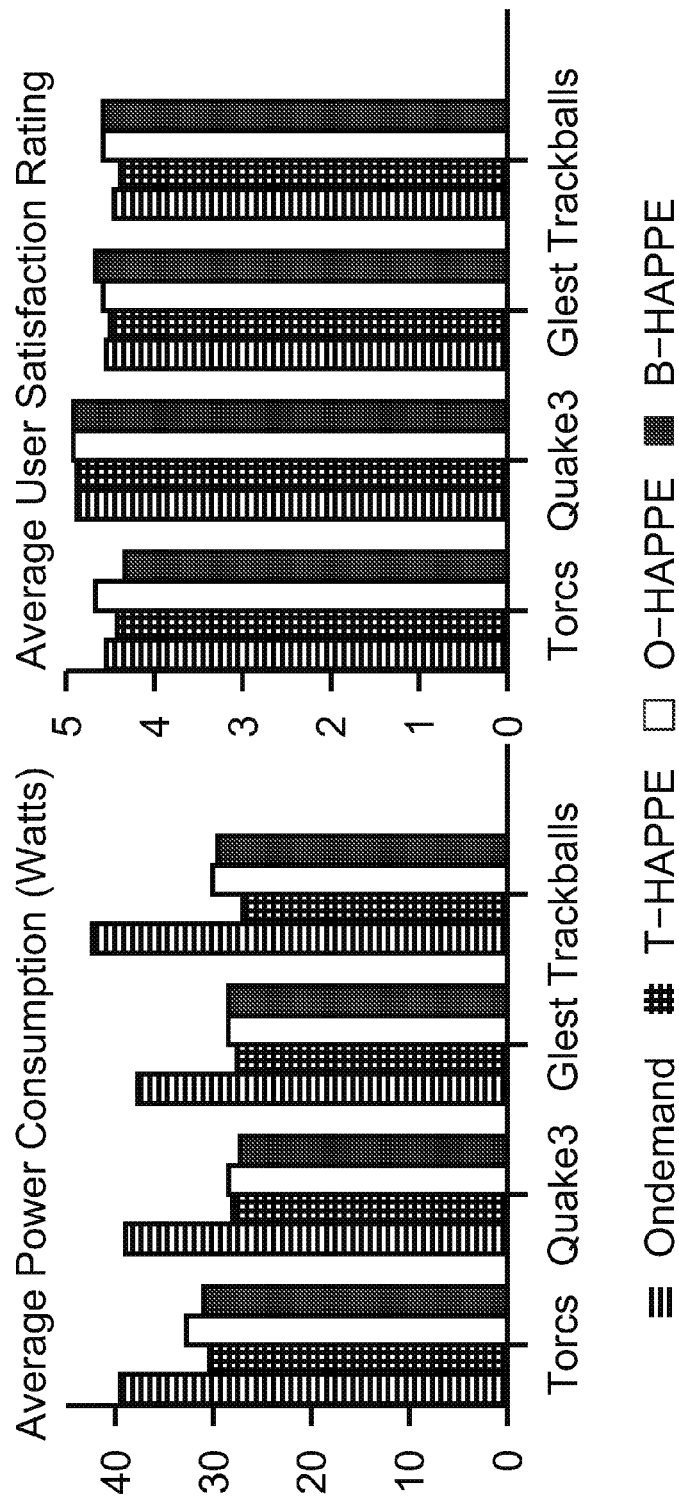
FIG. 11 shows a comparison of HAPPE with Linux Ondemand frequency controller according to some embodiments of the present invention.

FIG. 11 illustrates the aggregated power consumption and satisfaction ratings across all users for each tested application, comparing HAPPE with the Linux ondemand frequency controller. For each user, each application, and each technique (ondemand, T-HAPPE, O-HAPPE, and B-HAPPE), we obtain the average power consumption during the two minutes the user plays the game.

We note the following observations:

Compared to the Linux ondemand governor, across all four applications, the average reduction in power consumption is 28.50% during the HAPPE training phase, 24.39% during the HAPPE operating phase without the battery indicator, and 26.56% during the HAPPE operating phase with the battery indicator in accordance with some embodiments of the present invention. These results are expected, because (1) during the training phase, the frequency starts low and only increases gradually when the user requires higher performance, and (2) the battery indicator, which provides a feedback on the long-term battery life benefits of pressing the power key, gives the user more incentive to save power.

Across all four applications, the average user satisfaction is 4.61 with the ondemand governor, 4.55 during the HAPPE training phase, 4.69 during the HAPPE operating phase without the battery indicator, and 4.63 during the HAPPE operating phase with the battery indicator in accordance with some embodiments of the present invention. These results indicate that users are in general slightly less satisfied during the training phase, and more satisfied during the operating phase. In addition, the battery indicator can motivate users to save power by pressing the power key, but this appears to very slightly reduce their satisfaction. Nonetheless, compared to the default ondemand governor, during the HAPPE operating phase, users satisfaction actually increases slightly. This improvement could be noise, or might be due to the fact that users are happier when they feel they have control over the computer, e.g., when they press the performance button, they see an instant improvement in the performance/responsiveness. We considered the possibility of hardware thermal emergency throttling. However, we ruled out that explanation based on the dynamic frequency, temperature, and power consumption measurements obtained during the user studies.

We consider the full-system power reduction relative to the default ondemand controller achieved by HAPPE to be substantial. Table 4 presents the measured results of average system power consumption of the laptop at all five frequencies and ten CPU utilization levels derived by running a testing application that allows fine-grained CPU utilization control. CPU frequency was kept static during the experiments.

To approximate the scenarios in the user study, we subjected CPU0 to 10 different load levels at each frequency level, for one minute each. To approximate the graphic processing unit (GPU) load conditions during the user study, we also ran a 3D GPL screen saver that stresses the GPU but not the CPU. We measured the power consumption of the whole system using the data acquisition card. As shown in the table, when CPU utilization is above 80%, the highest possible reduction in system-wide power consumption by decreasing CPU frequency from the highest level to the lowest level is 40.63%. However, this brute-force strategy is very likely to annoy the user because it does not consider any performance impact, whereas some embodiments according to the present invention provide that HAPPE greatly reduce power consumption without degrading user satisfaction.

Figure 12:
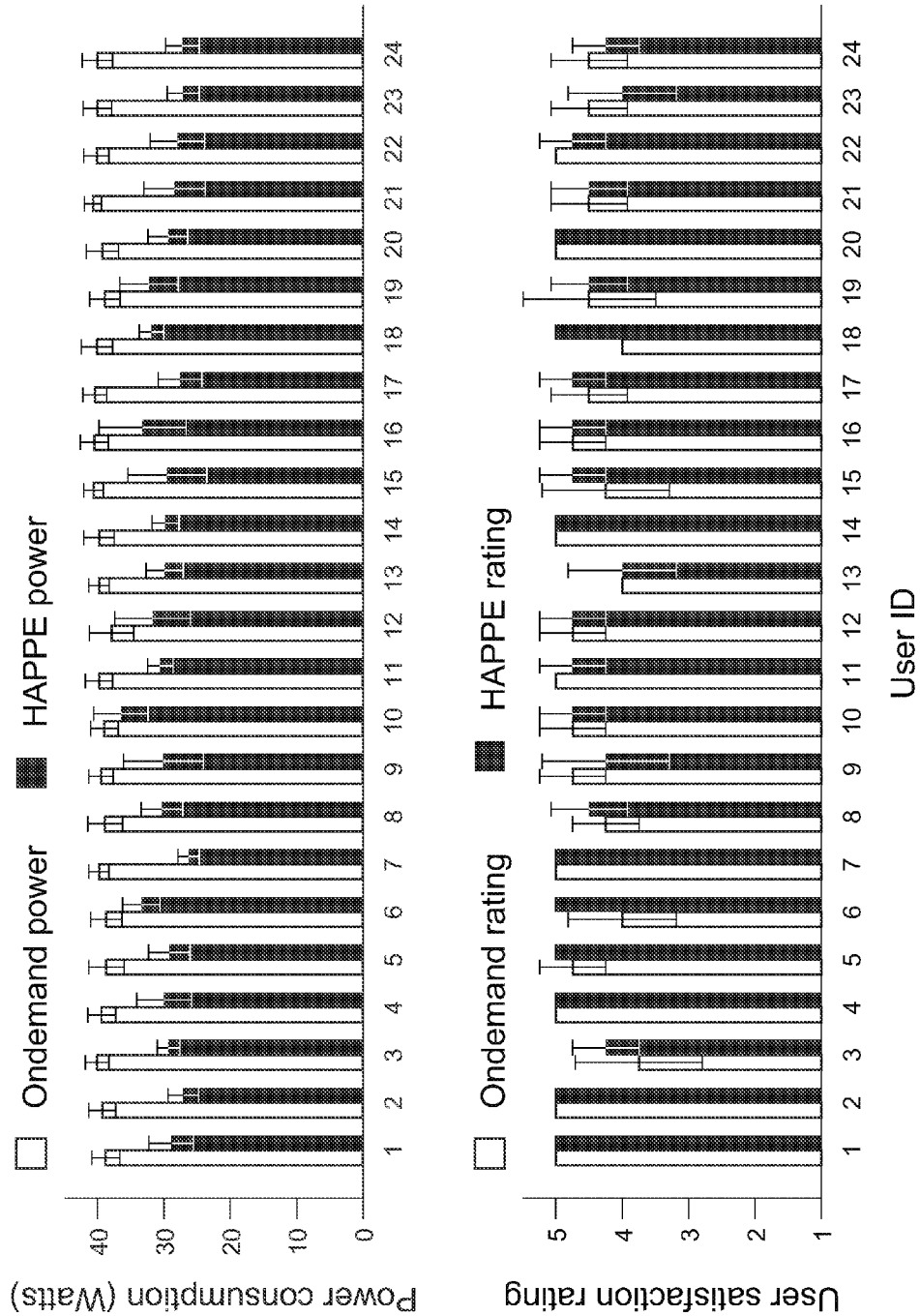
FIG. 12 shows variation among users with respect to power consumption and satisfaction according to some embodiments of the present invention.

FIG. 12 shows the variation among users by presenting the power consumptions and satisfaction ratings of all 24 users, comparing O-HAPPE to ondemand. For each user, we present the average power consumption and average satisfaction ratings for the four test applications, and show the standard deviations using error bars. As shown in the figures, there is significant variation among users. Some users are very sensitive to performance changes at different frequencies, and require high frequencies to be satisfied, resulting in high power consumption (e.g., user 10); others are less sensitive to the performance difference, and are satisfied at lower frequencies, resulting in lower power consumption (e.g., user 7).

Figure 13:
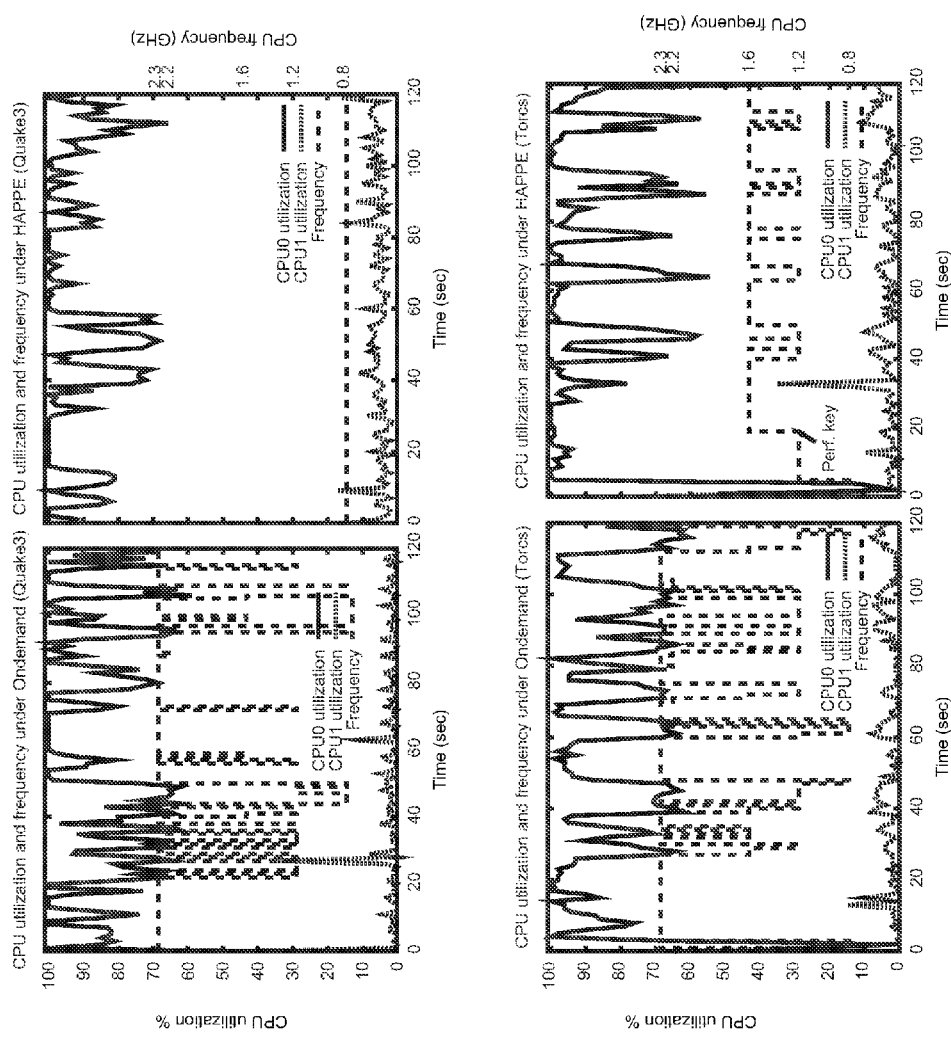
FIG. 13 shows variation among different applications for the same user according to some embodiments of the present invention.

We present the variation among the performance requirements for different applications from the same user. FIG. 13 illustrates a randomly-selected user playing Torcs (car racing game), and Quake3 (shooting game), under the control of ondemand and O-HAPPE. Under the control of HAPPE, when playing Torcs, the user pressed the performance key once at 20 seconds, and presumably became satisfied with the resulting 1.6 GHz frequency. Therefore, HAPPE set the CPU frequency to 1.6 GHz at high utilization levels and 1.2 GHz at low utilization levels. On the contrary, when playing Quake3, the same user was satisfied with the lowest frequency, and did not press the performance key at all. Therefore, HAPPE set the CPU frequency to 0.8 GHz at all times. The ondemand governor did not distinguish between the two applications, and decided frequency using only CPU utilization. Because both applications are CPU-intensive, the frequency stayed at the highest level most of the time, wasting power without an impact on user satisfaction in accordance with some embodiments of the present invention.

To create the user application frequency profile in accordance with some embodiments of the present invention, HAPPE may use, for example, user input via the performance and power keys during the training phase. After the training phase, user input is not required, but is still permitted. Therefore, if the user's performance requirements at different CPU utilization levels for this application do not change, the user never needs to send HAPPE inputs again. Table 5 presents the number of key presses during the training phase and the operating phase, averaged over all users. There are usually more performance key presses and fewer power key presses during the training phase than the operating phase. On average, less than two performance key presses per minute were used by users to adapt to a desired frequency, during the first few minutes of the training phase.

TABLE 5

AVERAGE NUMBER OF KEY PRESSES PER MINUTE

| App. | Training | | Operating | |
| --- | --- | --- | --- | --- |
| | Perf. | Power | Perf. | Power |
| Tores | 1.13 | 0.40 | 0.46 | 0.27 |
| Glest | 0.36 | 0.23 | 0.19 | 0.34 |
| Trackballs | 0.69 | 0.14 | 0.14 | 0.16 |
| Quake3 | 0.13 | 0.38 | 0.11 | 0.38 |

Figure 14:
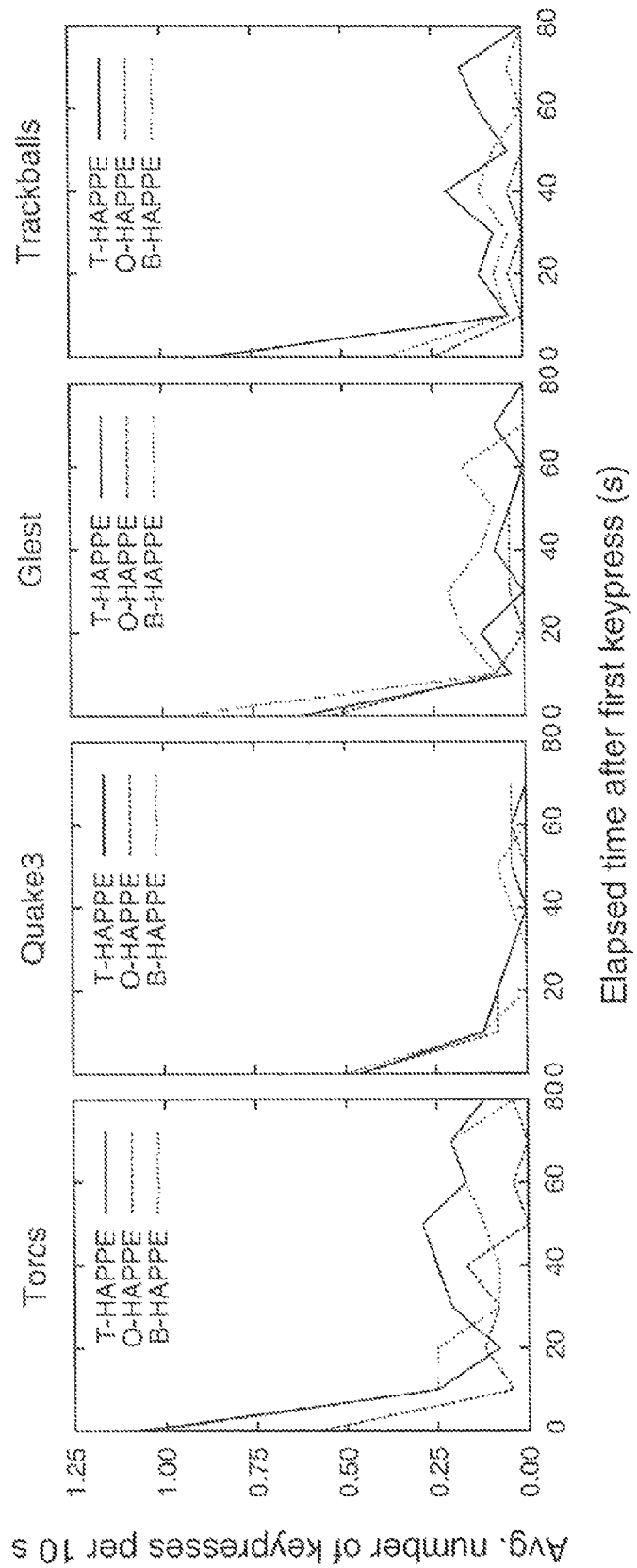
FIG. 14 shows an aggregated histogram of key presses according to some embodiments of the present invention.

We compare the average number of user inputs of HAPPE to that of UDFS. UDFS requires 5.73 key presses per minute, averaged across all three evaluated applications and all 20 users. In contrast, HAPPE requires 0.86 key presses per minute during the training phase and 0.51 key presses during the operating phase, averaged across all four evaluated applications and all 24 users. Furthermore, UDFS always slowly decreases frequency unless the user expresses discomfort via key presses. Although UDFS adapts the rate of frequency decrease to user input, users are never free of key presses, i.e., after a certain time period, they must press the key again to change to a desirable frequency. In contrast, once a user is satisfied with the performance and frequency profile, HAPPE does not require key presses again. FIG. 14 illustrates the frequency of key presses as a function of time, averaged over all users for each of the four testing applications. The x-axis represents elapsed time after the first key press, and the y-axis represents the average number of key presses in every 10-second interval. As shown in FIG. 14, the training phase generally requires more key presses. However, as time goes by, the number of key presses decreases dramatically during both the training phase and the operating phase.

For CPU-intensive interactive applications, traditional DVFS policies that use CPU utilization as the only metric to decide frequency usually result in unnecessarily-high frequency and therefore wasted power.

Some embodiments according to the present invention provide HAPPE, a dynamic CPU DVFS controller that adapts CPU voltage and frequency to the performance requirements of individual users and applications. Some embodiments according to the present invention provide that HAPPE uses a learning algorithm that creates a profile for each user and application. In accordance with some embodiments of the present invention, for each CPU utilization level, HAPPE learns the frequency that satisfies the user. Some embodiments according to the present invention provide that the learning algorithm trains the profile by accepting user keypress inputs during the first few minutes the first time the user runs the application. In accordance with some embodiments of the present invention, after the training phase, HAPPE does not require continued user input.

We evaluated HAPPE with a study on 24 users and four test applications. Compared to the Linux default ondemand frequency governor, HAPPE reduces system-wide power consumption by 25% on average, without degrading user satisfaction.

Some embodiments of the present invention may be realized in hardware, software, or a combination of hardware and software. Some embodiments of the present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Some embodiments of the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While some embodiments of the present invention have been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for controlling power consumption in a computer system, comprising:

for each of a plurality of interactive applications:
changing a discrete frequency at which a processor of the computer system runs;
receiving an indication of user satisfaction in response to the changed discrete frequency;
training the computer system to determine a relationship information between the changed discrete frequency and the user satisfaction of the interactive application, wherein the determined relationship distinguishes between different users and different interactive applications; and
storing the determined relationship information;
selecting a frequency of the discrete frequencies at which the processor of the computer system runs based on the determined relationship information for a particular user and a particular interactive application running on the processor of the computer system; and
adapting the processor of the computer system to run at the selected frequency.

2. The method according to claim 1, wherein the determined relationship is stored in a user application frequency profile.

3. The method according to claim 1, wherein the selected frequency is a highest frequency of the discrete frequencies to satisfy concurrent users of the computer system.

4. The method according to claim 1, wherein the determined relationship distinguishes between different combinations of concurrently running interactive applications.

5. The method according to claim 1, wherein the determined relationship is stored in a user application frequency profile that divides normalized CPU utilization into a plurality of discrete levels.

6. The method according to claim 5, wherein normalized CPU utilization is normalized by a maximum frequency of the discrete frequencies.

7. The method according to claim 5, wherein, during the training, a user satisfaction frequency is determined for each of the discrete levels of the normalized CPU utilization.

8. The method according to claim 5, wherein the computer system learns a least a respective frequency that satisfies a corresponding user for different discrete levels of the normalized CPU utilization for a particular interactive application.

9. The method according to claim 8, comprising:
automatically loading the determined relationship when upon later invocation of the particular interactive application.

10. The method according to claim 1, comprising:
minimizing power consumption of the processor without degrading user-perceived performance.

11. The method according to claim 1, wherein the training comprises monitoring key-press events to determine an optimal frequency for a particular user and a particular interactive application.

12. The method according to claim 11, wherein the monitoring comprises monitoring a performance key and a power key.

13. The method according to claim 1, wherein the training comprises building a correlation network based on a counter statistics and user feedback.

14. The method according to claim 1, wherein the training comprises counting by hardware performance counters.

15. The method according to claim 14, wherein the hardware performance counters count respective types of events.

16. The method according to claim 15, wherein the types of events comprise one or more of the following: instructions issued, cycles stalled on any response, total cycles, level 2 cache misses, branch target address cache misses, conditional branches mispredicted, hardware interrupts, level 1 data cached accesses, and level 1 instruction cache accesses.

17. The method according to claim 16, wherein the training comprises determining correlations based on the user satisfaction and counts on the hardware performance counters.

18. The method according to claim 1, wherein the training comprises modeling a user-aware performance prediction model based on at least the determined correlations.

19. The method according to claim 18, wherein the training comprises training an artificial neural network that can predict the user satisfaction for particular operating conditions as indicated by hardware performance counters.

20. The method according to claim 19, comprising:
predicting, for a particular user and a particular interactive application, the user satisfaction for particular current operating conditions as indicated by current hardware performance counters,
wherein the selecting of the frequency is based on the predicted user satisfaction.

* * * * *